(12) United States Patent
Terabe

(10) Patent No.: US 7,636,366 B2
(45) Date of Patent: Dec. 22, 2009

(54) OFDM RADIO COMMUNICATIONS SYSTEM

(75) Inventor: Shigeo Terabe, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 454 days.

(21) Appl. No.: 11/515,290

(22) Filed: Sep. 1, 2006

(65) Prior Publication Data

US 2007/0189149 A1 Aug. 16, 2007

(30) Foreign Application Priority Data

Feb. 13, 2006 (JP) .............................. 2006-035541

(51) Int. Cl.
*H04L 12/28* (2006.01)
*H04L 12/56* (2006.01)

(52) U.S. Cl. ...................... 370/401; 370/402; 370/404

(58) Field of Classification Search ................ 370/401, 370/208, 491, 348, 512; 455/127, 571, 127.1
See application file for complete search history.

(56) References Cited

U.S. PATENT DOCUMENTS

2007/0165514 A1 7/2007 Akita

FOREIGN PATENT DOCUMENTS

JP 2007-189646 A 7/2007

OTHER PUBLICATIONS

"MBMS transmission in E-UTRA", LG Electronics, [online], Dec. 16, 2005 [searched Dec. 20, 2005], Internet <URL:http://www.3gpp.org/ftp/tsg_ran/WG1_RL1/TSGR1_43/Docs/R1-051300.zip>.

*Primary Examiner*—Dang T Ton
*Assistant Examiner*—Frederick Ott
(74) *Attorney, Agent, or Firm*—Frishauf, Holtz, Goodman & Chick, P.C.

(57) ABSTRACT

A transmitter forms each subcarrier group of only frequency locations of subcarriers to which at least one pilot signal is allocated, and conducts transmission by allocating a macro-diversity signal into the subcarrier group and allocating a non-macro-diversity signal to other frequencies (outside the subcarrier group). As for the macro-diversity signal, a receiver conducts channel estimation on the basis of the pilot signal in the same subcarrier group as the macro-diversity signal. As for the non-macro-diversity signal outside the subcarrier group, the receiver conducts channel estimation on the basis of the pilot signal, and results of channel estimations of the macro-diversity signal and other non-macro-diversity signals.

10 Claims, 18 Drawing Sheets

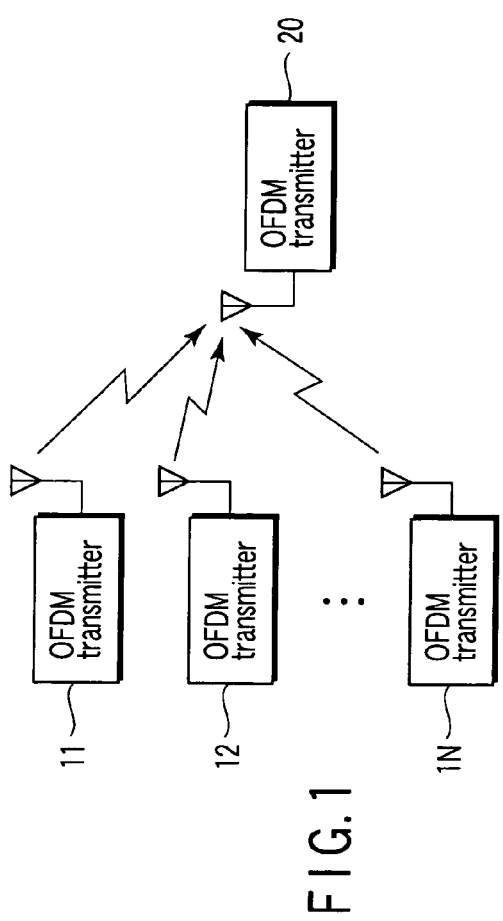
F I G. 1
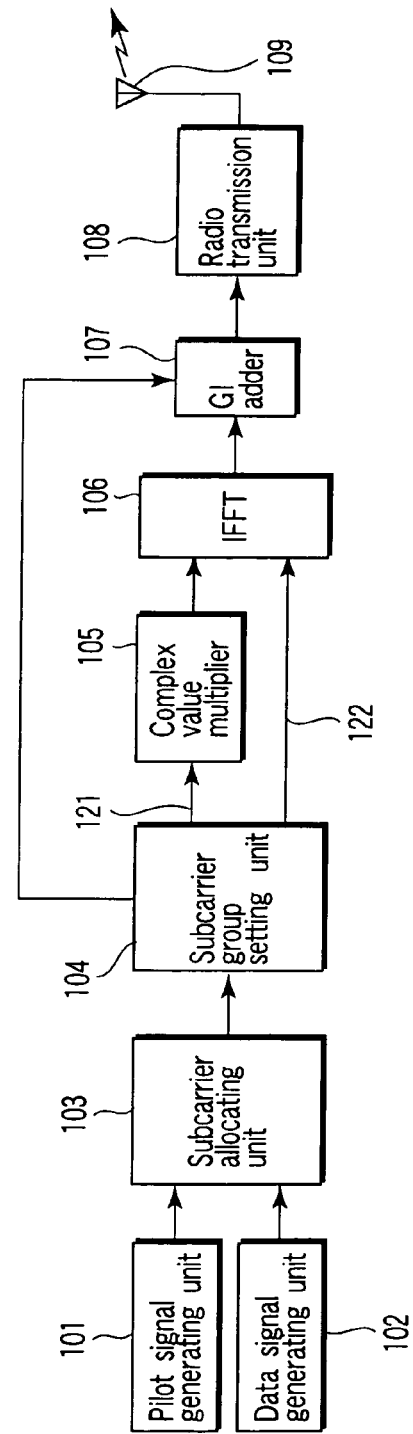
F I G. 2

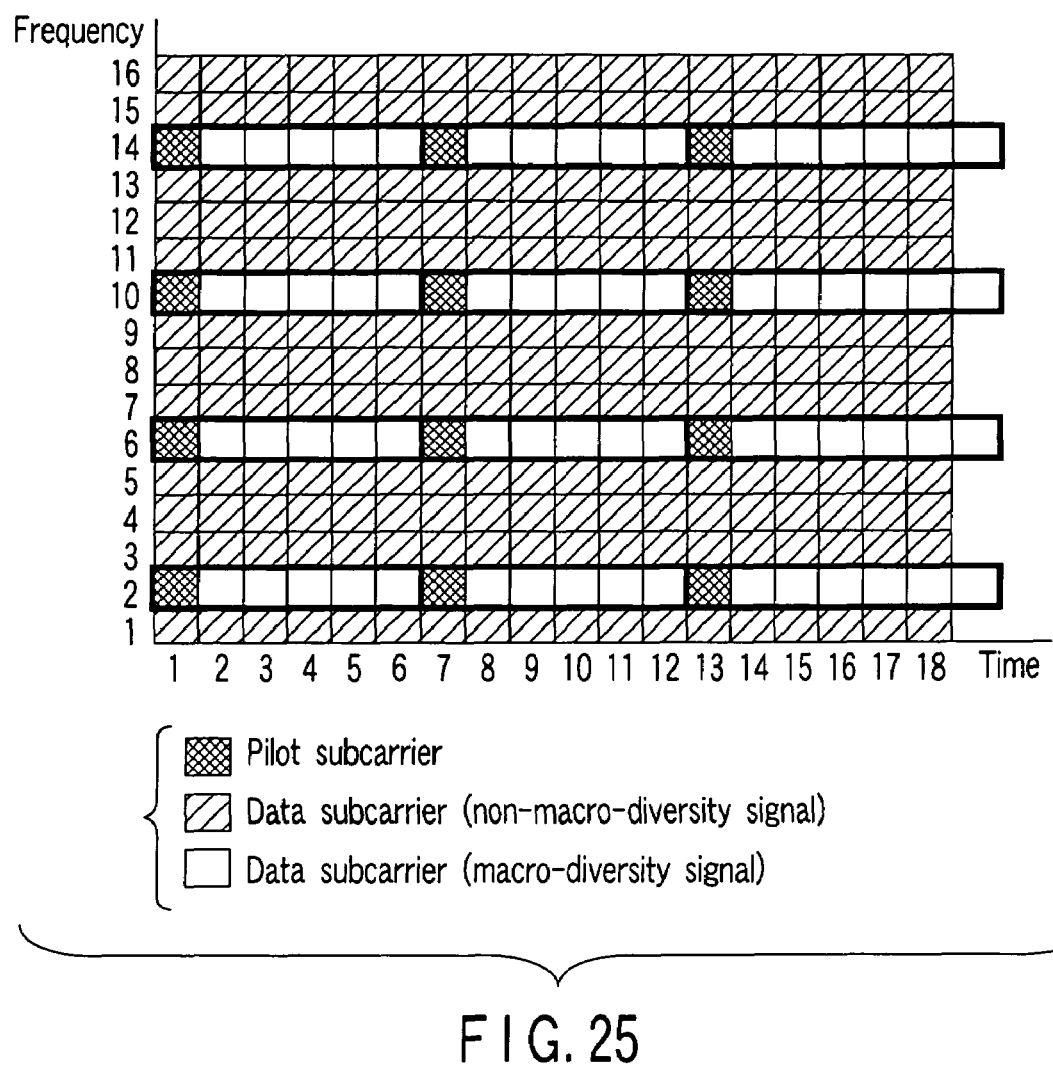
F I G. 25

OFDM RADIO COMMUNICATIONS SYSTEM

CROSS-REFERENCE TO RELATED APPLICATIONS

This application is based upon and claims the benefit of priority from prior Japanese Patent Application No. 2006-035541, filed Feb. 13, 2006, the entire contents of which are incorporated herein by reference.

BACKGROUND OF THE INVENTION

1. Field of the Invention

This invention relates to an OFDM radio communications system conducting radio communications in the OFDM (Orthogonal Frequency Division Multiplexing) scheme.

2. Description of the Related Art

According to known macro-diversity receiving technology, a required gain can be obtained by transmitting the same pilot signal and data signal with the same carrier frequency from a plurality of transmitters and synthesizing the signals by a receiver. "MBMS transmission in E-UTRA", from LG Electronics, discloses a frame configuration for conducting macro-diversity in the OFDM radio communications system wherein signals to which macro-diversity reception is applied and signals to which macro-diversity reception is not applied are present together.

In the frame configuration disclosed in "MBMS transmission in E-UTRA", pilot signals alone are scrambled by a scrambling pattern defined for each of the transmitters. Data signals are not scrambled. The scrambling pattern is set such that the pilot signals have an orthogonal or pseudo-orthogonal relationship with one another. In this frame configuration, the pilot signals can be separated from signals transmitted from other transmitters on the receiver side by being orthogonalized or pseudo-orthogonalized with the signals from other transmitters. Therefore, the pilot signals can be used for estimation of a channel response to the signals to which the macro-diversity reception is not applied.

To conduct the macro-diversity reception for the signals transmitted in the frame configuration disclosed in "MBMS transmission in E-UTRA", two-stage processings need to be executed on the receiver side. At the first stage, the responses of channels from the transmitters to the receiver are estimated individually by taking advantage of the matter that the scrambling pattern applied to the pilot signals has an orthogonal or pseudo-orthogonal relationship in the transmitters. At the second stage, channel equalization, i.e. equalization of compensating for channel distortion which the received data signals undergo is conducted by utilizing the sum of the individually estimated channel responses. Thus, the data signals transmitted to the receiver from the transmitters over the respective channels can be subjected to channel equalization.

The channel responses from the transmitters to the receiver need to be estimated individually, to conduct the macro-diversity reception on the receiver side for the signals of the frame configuration disclosed in "MBMS transmission in E-UTRA". In other words, although the sum of the channel responses alone is essentially required for the channel equalization in the macro-diversity reception, the channel responses need to be obtained individually in "MBMS transmission in E-UTRA". For this reason, the calculation amount is increased.

On the other hand, in the processing of estimating the channel responses individually, the channel response of the desired channel alone is taken out by canceling the channel responses of the other channels by taking advantage of the matter that the scrambling pattern has an orthogonal or pseudo-orthogonal relationship in the transmitters. However, the orthogonality or pseudo-orthogonality is restricted due to the channel distortion and the effect of canceling the other channel responses may be made smaller. In this case, since the other channel responses are superposed on the desired channel response as interference, the estimation accuracy of the desired channel response is deteriorated.

Furthermore, in the processing of estimating the channel responses individually, the receiver needs to recognizes all the scrambling patterns included in the receive signal. If the receiver does not recognize some of the scrambling patterns, the receiving performance is deteriorated since the channel responses from the transmitters to the receiver, corresponding to the respective scrambling patterns cannot be estimated. In addition, if the receiver identifies by mistake the scrambling pattern which is not included in the receive signal, an estimation of the channel response generated by the misidentified scrambling pattern includes only interference and the receiving performance is thereby deteriorated. To identify the scrambling patterns, the receiver needs to control the information on to which scrambling pattern the received signal corresponds and, therefore, the control on the receiver side becomes complicated.

Thus, in a case where the transmitted signal is subjected to the macro-diversity reception on the receiver side in the conventional configuration disclosed in "MBMS transmission in E-UTRA", the problems such as an increase of the calculation amount, deterioration of the channel estimation accuracy caused by the interference, and complicated controls are caused.

BRIEF SUMMARY OF THE INVENTION

The present invention has been accomplished to solve the above-described problems. The object of the present invention is to provide an OFDM radio communications system which has a small calculation amount and little deterioration of the channel estimation accuracy caused by the interference, when the macro-diversity reception is conducted at the receiver side, and which can be easily controlled, with high transmission efficiency.

To achieve this object, an aspect of the present invention is an OFDM radio communications system comprising a plurality of transmitters transmitting OFDM signals and a receiver conducting macro-diversity reception based on the OFDM signals. In the OFDM radio communications system, each of the transmitters comprises first allocation means, second allocation means, third allocation means and transmission means. The first allocation means allocates pilot signals to a first pilot subcarrier and a second pilot subcarrier different in frequency, respectively. The second allocation means allocates a macro-diversity signal subjected to macro-diversity to a first data subcarrier whose frequency is same as the first pilot subcarrier and whose transmission timing is successive to the first pilot subcarrier, and allocates a macro-diversity signal subjected to macro-diversity to a second data subcarrier whose frequency is same as the second pilot subcarrier and whose transmission timing is successive to the second pilot subcarrier. The third allocation means allocates a non-macro-diversity signal not subjected to the macro-diversity to a third data subcarrier whose frequency is between the frequency of the first pilot subcarrier and the frequency of the second pilot subcarrier and whose transmission timing is between the transmission timing of the first pilot subcarrier and the transmission timing of the second pilot subcarrier. The transmission means OFDM-modulates and transmits the pilot signals, the macro-diversity signals and the non-macro-diversity signal, through the subcarriers to which the signals are allocated by the first allocation means, the second allocation means and the third allocation means.

The receiver comprises reception means, first estimation means and second estimation means. The reception means receives the pilot signals, the macro-diversity signals and the non-macro-diversity signal, through the subcarriers transmitted by the transmission means. The first estimation means conducts channel estimation of the first data subcarrier in accordance with the pilot signal of the first pilot subcarrier received by the reception means, and conducts channel estimation of the second data subcarrier in accordance with the pilot signal of the second pilot subcarrier received by the reception means. The second estimation means conducts channel estimation of the third data subcarrier in accordance with the pilot signal of the first pilot subcarrier received by the reception means and the pilot signal of the second pilot subcarrier received by the reception means.

According to this aspect of the present invention, the present invention can provide an OFDM radio communications system having a good reception accuracy and high transmission efficiency in a case where a signal to which the macro-diversity reception is applied and a signal to which the macro-diversity reception is not applied are present together.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a schematic illustration of an OFDM radio communications system according to an embodiment of the present invention;

FIG. 2 is a block diagram showing an example of an OFDM transmitter shown in FIG. 1;

FIG. 25 is an illustration of a modified example of the subcarrier location shown in FIG. 22;

DETAILED DESCRIPTION OF THE INVENTION

An embodiment of the present invention will be explained below with reference to the accompanying drawings.

As shown in FIG. 1, a radio communications system according to the embodiment of the present invention comprises a plurality of OFDM transmitters 11, 12, ..., 1N, and an OFDM receiver 20 receiving OFDM signals transmitted from the OFDM transmitters 11, 12, ..., 1N over different channels (propagation paths). Each of the OFDM transmitters 11, 12, ..., 1N transmits the OFDM signal. All the OFDM transmitters 11, 12, ..., 1N do not need to be arranged at different locations but some of them may be arranged at the same location. For example, two of the OFDM transmitters may be provided in a single radio communications apparatus. In these cases, some constituent elements common to the OFDM transmitters such as a subcarrier allocating unit and a subcarrier group setting unit to be described later may be shared by a plurality of OFDM transmitters.

Figure 3:
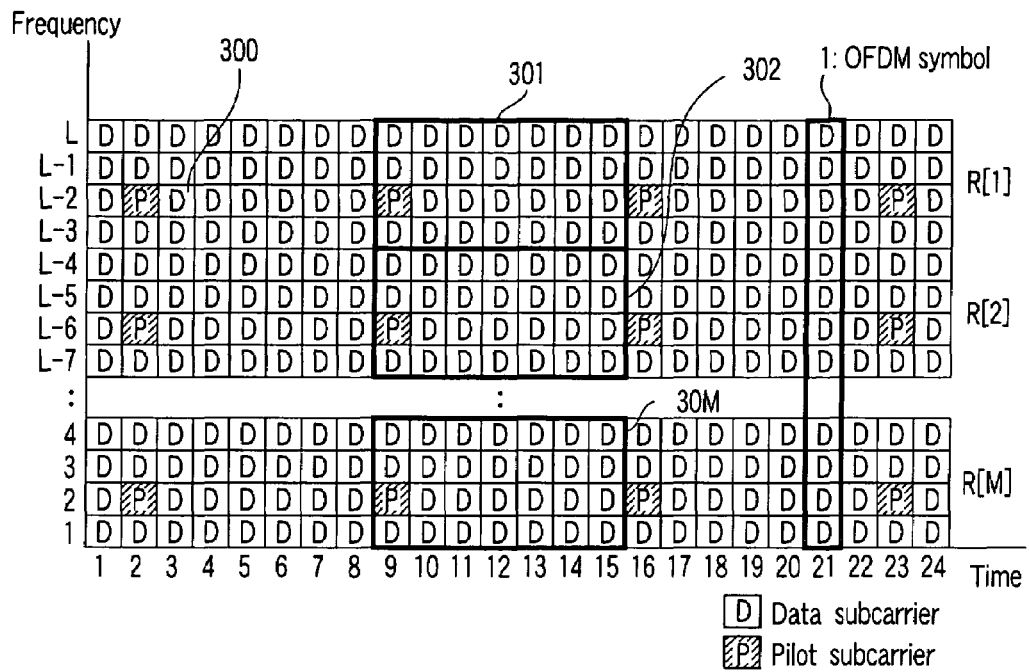
FIG. 3 is an illustration describing subcarrier allocation and settings of subcarrier groups in the OFDM transmitter.

FIG. 2 shows a configuration of the OFDM transmitter. FIG. 3 illustrates circumstances of subcarrier allocation conducted by a subcarrier allocating unit 103 in FIG. 2 and settings of the subcarrier group by a subcarrier group setting unit 104 in FIG. 2. In FIG. 3, the OFDM symbols are located along a lateral time axis while a plurality of subcarriers forming each of the OFDM symbols are arranged along a longitudinal frequency axis. 1, 2, . . . , L aligned along the frequency axis represent the subcarrier numbers. 1, 2, . . . , aligned along the time axis represents the OFDM symbol numbers.

In FIG. 2, a pilot signal generating unit 101 generates a pilot signal by processing a bit string which is an origin of the pilot signal by digital modulation such as quadrature phase shift keying (QPSK). Similarly, a data signal generating unit 102 generates a data signal by processing a bit string which is an origin of the data signal by digital modulation such as quadrature phase shift keying (QPSK). Each of the pilot signal and the data signal is represented as a complex value. The pilot signal is used for, for example, channel estimation (estimation of channel response). The pilot signal may also be used for the timing synchronization or frequency synchronization. In the following embodiment, a case of using the pilot signal for the channel estimation is described.

The generated pilot signal and data signal are allocated to subcarriers corresponding thereto, i.e. a pilot subcarrier and a data subcarrier, respectively, by the subcarrier allocating unit 103. "Allocating a signal to a subcarrier" means adding a subcarrier index representing a location of the corresponding subcarrier in a time axis and a frequency axis, to the signal represented as a complex value. For example, a subcarrier index (3, L-2) is added to a data signal 300 in FIG. 3.

The pilot signal and the data signal allocated to the pilot subcarrier and the data subcarrier, respectively, by the subcarrier allocating unit 103 are input to the subcarrier group setting unit 104. The subcarrier group setting unit 104 sets at least one subcarrier group including at least one pilot subcarrier to which the pilot signal is allocated and at least one data subcarrier to which the data signal is allocated. In FIG. 3, a plurality (M) of subcarrier groups 301, 302, . . . , 30M are set. "Setting the subcarrier group" means adding an index (called a group index) to the pilot signal and the data signal to which the subcarrier indices are added. The group index is not added to the signal which does not belong to any subcarrier groups.

In the OFDM transmitters 11, 12, . . . , 1N shown in FIG. 1, at least one common subcarrier group to the transmitters is set by the subcarrier group setting unit 104. In other words, at least one of the subcarrier groups set by the subcarrier group setting unit 104, in the OFDM transmitters 11, 12, . . . , 1N is common. In the common subcarrier group, the common pilot signal and the common data signal in the OFDM transmitters 11, 12, . . . , 1N are allocated to the pilot subcarrier and the data subcarrier, respectively.

Signals 121 for which the subcarrier group is set by the subcarrier group setting unit 104, i.e. the pilot signal (first pilot signal) and the data signal (first data signal) to which the group indices are added are input to an inverse fast Fourier transform (IFFT) unit 106 serving as an OFDM modulator via a complex value multiplier 105. Signals 122 for which the subcarrier group is not set, i.e. the pilot signal (second pilot signal) and the data signal (second data signal) to which the group indices are not added are input directly to the IFFT unit 106.

The complex value multiplier 105 multiplies the group index-added pilot signal and data signal by the complex value determined for each pilot signal and data signal of the same group index or a complex number sequence. In the example of FIG. 3, subcarrier groups 301, 302, . . . , 30M are multiplied by complex values R[1], R[2], . . . , R[M], respectively. Absolute values of the complex values determined for the respective subcarrier groups may be the same. By making the absolute values thereof the same, occurrence of difference in power of the subcarrier groups can be avoided. The complex values include real values, for example, ±1. The pilot signal and data signal multiplied by the complex value are input to the IFFT unit 106.

The IFFT unit 106 generates the OFDM signal as a sequence of a plurality of OFDM symbols by conducting the OFDM modulation for the signals input from the subcarrier group setting unit 104 and the complex value multiplier 105. In other words, the IFFT unit 106 generates the OFDM signal by converting the frequency-area signal into the time-area signal. After the GI adder 107 adds the guard interval (GI) to the generated OFDM signal, the OFDM signal is converted into a radio (RF) signal by a radio transmission unit 108 comprising a DA converter, an up-converter, a power amplifier, etc. The radio (RF) signal is transmitted from an antenna 109. The length of the guard interval added by the GI adder 107 is set in accordance with an instruction from a subcarrier group setting unit 104 to be described later.

Figure 4:
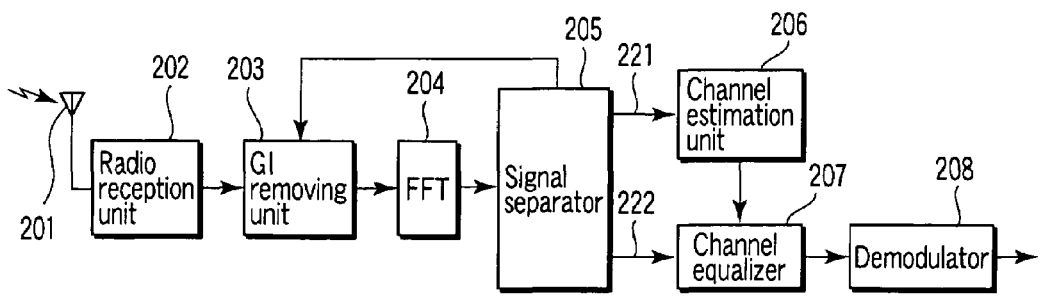
FIG. 4 is a block diagram showing an example of an OFDM receiver shown in FIG. 1.

Next, the OFDM receiver 20 shown in FIG. 1 is explained with reference to FIG. 4. FIG. 4 shows a configuration of the OFDM receiver 20 relating to the macro-diversity reception. An RF signal received by an antenna 201 is converted into a baseband digital signal by a radio reception unit 202 comprising a low-noise amplifier, a down-converter, an AD converter, etc. After the guard interval is removed from the baseband digital signal by a GI removing unit 203, the time-area signal is divided into frequency-area signals, i.e. signals for the respective subcarriers, by a fast Fourier transform (FFT) unit 204. The output signals from the FFT unit 204 are input to a signal separator 205.

The signal separator 205 separates a pilot signal 221 and a data signal 222 allocated to the subcarriers which are present in the subcarrier group. The separated pilot signal 221 is input to a channel estimation unit 206 while the separated data signal 222 is input to a channel equalizer 207. The channel estimation unit 206 conducts channel estimation by conducting averaging or interpolation of the pilot signal 221 for each of the subcarrier groups, and then outputs a channel estimation value representing a channel response. The channel equalizer 207 conducts channel equalization for the data signal 222 by using the channel estimation value output from the channel estimation unit 206. The data signal subjected to channel equalization is demodulated by a demodulator 208 and a bit string which is an original of the data signal is thereby regenerated.

Next, operations of the channel estimation unit 206 are described in more detail. For simple explanations, it is assumed that widths in the time direction and frequency direction of the subcarrier group are sufficiently smaller than variation cycles in the time direction and frequency direction of the channel. In this case, the channel responses to the signals allocated to the subcarriers in the subcarrier group can be considered substantially constant. As described with reference to FIG. 2, all the pilot signals and data signals allocated to the subcarriers in the subcarrier group set by the subcarrier group setting unit 104 are multiplied by the complex value determined for each subcarrier group by the complex value multiplier 105. If the complex value is represented as R and the channel response is represented as H, the pilot signal and the data signal allocated to the subcarriers in the same subcarrier group are commonly influenced by distortion represented as H*R. This matter is considered to indicate that the OFDM signal transmitted from the OFDM transmitter consequently receives the channel response represented as H*R.

In other words, in the OFDM receiver 20, the case where the signals allocated to the subcarriers in the same subcarrier group from each of OFDM transmitters 11, 12, . . . , 1N are multiplied by different complex values, respectively, and then transmitted, can be handled similarly to the case where the signals are transmitted without being multiplied by the complex values. In the channel estimation unit 206, therefore, the channel estimation value can be obtained by dividing the received pilot signal by its original pilot signal, without using the complex values multiplied in the OFDM transmitters 11, 12, . . . , 1N. The original pilot signals are known signals in the OFDM receiver.

In a case where a plurality of pilot subcarriers are present in the subcarrier group, a high-accuracy channel estimation value can be obtained by averaging the values obtained by dividing the pilot signals allocated to the respective pilot subcarriers by their original pilot signals. If a plurality of pilot subcarriers are located remote from one another in the subcarrier group, a high-accuracy channel estimation value can be obtained by conducting the interpolation using the values obtained by dividing the pilot signals allocated to the respective pilot subcarriers by their original pilot signals.

Next, processes of the channel estimation and the channel equalization for the data subcarriers in the subcarrier group are described with formulae. In the following descriptions, a data signal is represented by D, a pilot signal allocated to a pilot subcarrier in the subcarrier group is represented by P, and a complex value by which the pilot signal and the data signal allocated to the subcarriers in the subcarrier group are multiplied, in n-th OFDM transmitter ln, is represented by Rn.

For simple explanations, the channel distortion applied to the pilot signal and the data signal allocated to the subcarriers which are present in the subcarrier group is considered constant, and the channel distortion of the channel from the OFDM transmitter ln to the OFDM receiver 20 is represented by Hn.

In this case, the pilot signal and the data signal transmitted from the OFDM transmitter ln are represented by P·Rn and D·Rn, respectively. Since P·Rn and D·Rn receive the channel distortion and then are synthesized by the antenna 201 of the OFDM receiver 20, received pilot signal Prx is represented in the following formula.

$$P_{rx} = P \cdot \sum_{n=1}^{N} (R_n \cdot H_n) \quad (1)$$

where N represents the number of OFDM transmitters. On the other hand, received data signal Drx is represented in the following formula.

$$D_{rx} = D \cdot \sum_{n=1}^{N} (R_n \cdot H_n) \quad (2)$$

In this case, data signal D can be restored by multiplying the data signal Drx by a inverse of the received pilot signal Prx and the known original pilot signal P, as represented by the following formula.

$$D_{rx} \cdot \frac{P}{P_{rx}} = D \cdot \sum_{n=1}^{N} (R_n \cdot H_n) \cdot \frac{1}{\sum_{n=1}^{N} (R_n \cdot H_n)} = D \quad (3)$$

On the other hand, according to the method disclosed in "MBMS transmission in E-UTRA", the data signal is not multiplied by the complex value at the transmitter. For this reason, the received pilot signal Prx becomes $$P_{rx} = P \cdot \sum_{n=1}^{N} (R_n \cdot H_n) \quad (4)$$

while the received data signal Drx becomes $$D_{rx} = D \cdot \sum_{n=1}^{N} (H_n) \quad (5)$$

In this case, it is apparent that the original data signal D is not restored even if the data signal is multiplied by the inverse of the received pilot signal and the pilot signal P, as represented in the following formula.

$$D_{rx} \cdot \frac{P}{P_{rx}} = D \cdot \sum_{n=1}^{N} (H_n) \cdot \frac{1}{\sum_{n=1}^{N} (R_n \cdot H_n)} \quad (6)$$

$$= D \cdot \frac{\sum_{n=1}^{N} (H_n)}{\sum_{n=1}^{N} (R_n \cdot H_n)}$$

To restore the original data signal D, a process of calculating $$\sum_{n=1}^{N} (H_n) \quad (7)$$

is required after estimating each Hn. As described above, the interference is often superposed in the processing of estimating each Hn, and the accuracy of the channel estimation is therefore deteriorated.

The method of restoring the original data signal by multiplying the data signal by the inverse of the received pilot signal and the pilot signal P has been described above. There is another method, other than this method. If Hcomb is set at $$H_{comb} = \frac{P_{rx}}{P} = \sum_{n=1}^{N} (R_n \cdot H_n) \quad (8)$$

the data signal can be restored, by multiplying the received data signal by a complex conjugate of Hcomb and a inverse of an absolute value of Hcomb, as represented in the following formula.

$$D_{rx} \cdot \frac{(H_{comb})*}{|H_{comb}|} = D \cdot H_{comb} \cdot \frac{(H_{comb})*}{|H_{comb}|} \quad (9)$$

$$= D \cdot \frac{|H_{comb}|^2}{|H_{comb}|}$$
$$= D \cdot |H_{comb}|$$

In this case, however, since the amplitude is shifted by |Hcomb|, a modulation point to be compared at the demodulation needs to be shifted by |Hcomb|.

As described above, in a case where the signals transmitted from the OFDM transmitters 11, 12, . . . , 1N are subjected to macro-diversity reception at the OFDM receiver 20, the calculation amount is reduced since the channel responses from the respective OFDM transmitters 11, 12, . . . , 1N to the OFDM receiver 20 do not need to be estimated individually. In other words, as represented in the formula (3), the original data signal D can be restored by only multiplying the received pilot signal Drx by the inverse of the received pilot signal P and the original pilot signal P. The interference occurring at the estimation of each of the channel responses can also be solved. Moreover, management of the scrambling pattern to estimate each of the channel responses does not need to be controlled.

Next, another examples of the OFDM transmitter and OFDM receiver are described. In an OFDM transmitter shown in FIG. 5, a scrambling unit 110 is added to the OFDM transmitter shown in FIG. 2. The scrambling unit 110 scrambles the signals 122 allocated to the subcarrier outside the subcarrier group set by the subcarrier group setting unit 104, i.e. the pilot signal and the data signal to which no group index is added, in scrambling patterns different in the OFDM transmitters. The scrambled signals are input to the IFFT unit 106.

Figure 5:
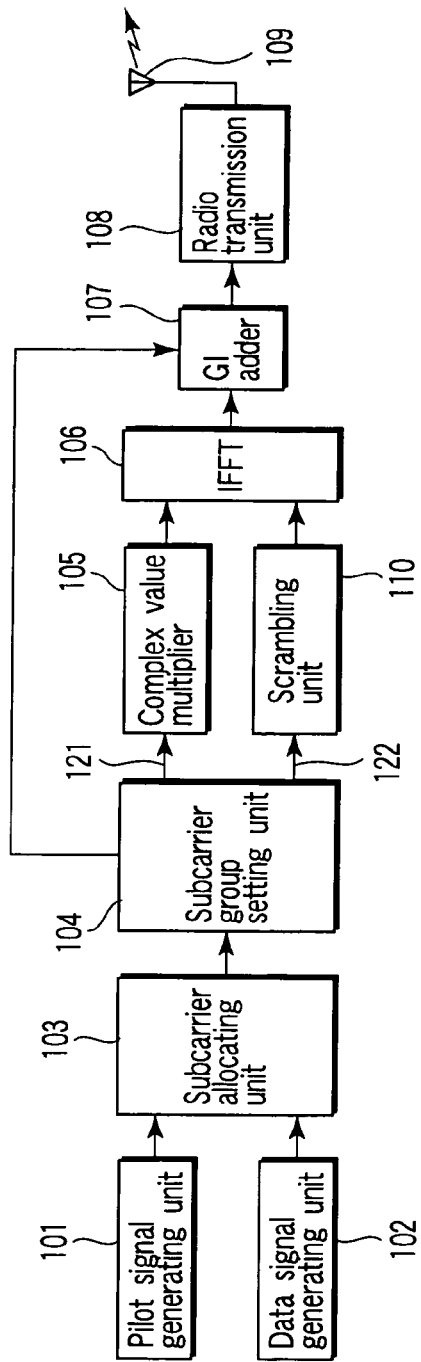
FIG. 5 is a block diagram showing another example of an OFDM transmitter shown in FIG. 1.
Figure 6:
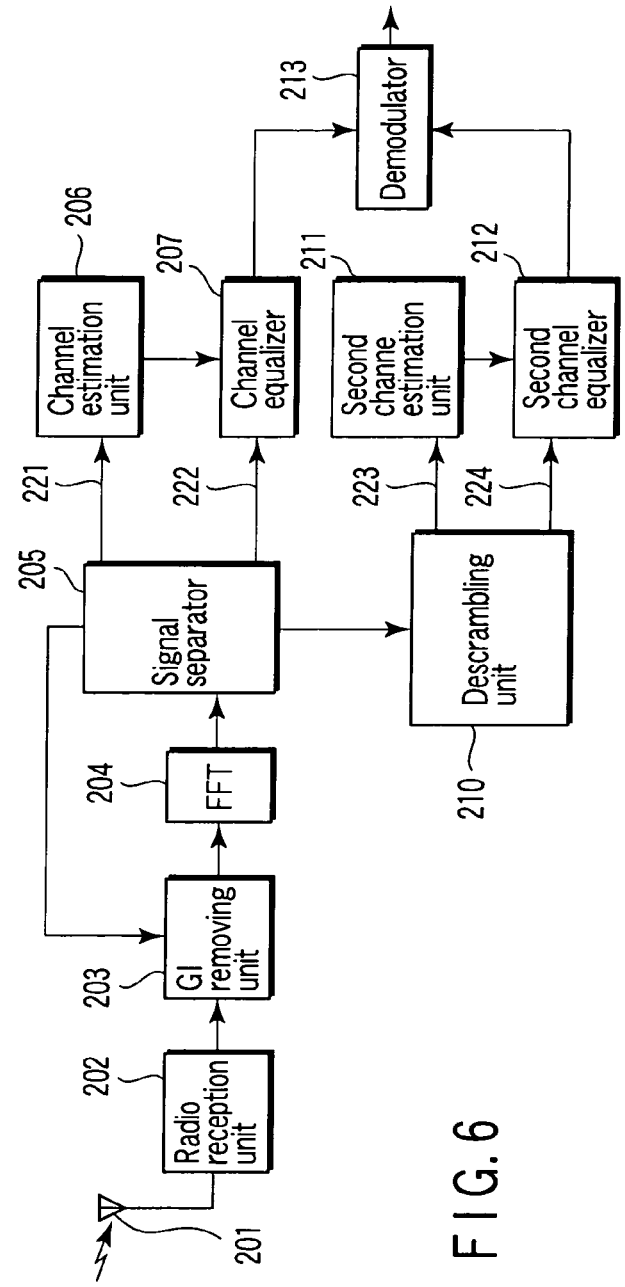
FIG. 6 is a block diagram showing another example of an OFDM receiver shown in FIG. 1.

FIG. 6 shows an OFDM receiver corresponding to the OFDM transmitter shown in FIG. 5. A descrambling unit 210, a second channel estimation unit 211 and a second channel equalizer 212 are added to the OFDM receiver shown in FIG. 4. The signals allocated to the subcarriers which are present in the subcarrier group are processed in the same manner as the manner in the OFDM receiver shown in FIG. 4. In other words, a pilot signal 221 and a data signal 222 allocated to the subcarriers which are present in the subcarrier group are input to the channel estimation unit 206 and the channel equalizer 207. The data signal 222 is subjected to the channel equalization by the channel equalizer 207, with the channel estimation value output from the channel estimation unit 206. The data signal subjected to the channel equalization by the channel equalizer 207 is demodulated by a demodulator 213. The bit string which is the original of the data signal is thereby reproduced.

On the other hand, the pilot signal and the data signal output from the signal separator 205 and allocated to the subcarriers outside the subcarrier group are descrambled by the descrambling unit 210. The descrambling unit 210 conducts descrambling in a descrambling pattern which is opposite to the scrambling pattern employed in the OFDM transmitter transmitting the signal to be received by the OFDM receiver. A pilot signal 223 descrambled by the descrambling unit 210 is input to the channel estimation unit 211 and a descrambled data signal 224 is input to the channel equalizer 212.

The channel estimation unit 211 conducts the channel estimation by conducting averaging and interpolation of the adjacent pilot signal and then calculates a channel estimation value representing a channel response. The channel equalizer 212 conducts the channel equalization for the descrambled data signal by using the channel estimation value output from the channel estimation unit 211. The data signal subjected to channel equalization as output from the channel equalizer 212 is input to a demodulator 213, and a bit string which is the original of the data signal is thereby regenerated.

By the averaging conducted by the channel estimation unit 211, the power can be made small and the accuracy in the desired channel estimation value can be enhanced in relation to the pilot signals transmitted from the OFDM transmitters different in scrambling pattern.

Thus, the signals allocated to the subcarriers outside the subcarrier group, i.e. the signals which are not subjected to the macro-diversity reception at the OFDM receiver 20 are scrambled by using the scrambling patterns different in the OFDM transmitters. The accuracy of the channel estimation value can be thereby enhanced in the general communications that are not the macro-diversity communications. The scrambling patterns may be predetermined in the transmitters and receiver. Otherwise, when the OFDM receiver 20 starts communications with the OFDM transmitters (for example, OFDM transmitter 11), the OFDM transmitter 11 may notify the OFDM receiver 20 of the scrambling patterns. Since the signals which are not subjected to the macro-diversity reception are scrambled, the OFDM receiver 20 does not need to recognize the scrambling patterns of all the OFDM transmitters.

As understood from the explanation of the reason, the data signal, of the signals allocated to the subcarriers outside the subcarrier group, does not need to be scrambled. Therefore, the pilot signal alone may be scrambled by the scrambling unit 110 shown in FIG. 5. In this case, the pilot signal alone is descrambled by the descrambling unit 210 shown in FIG. 6.

Next, a concrete method of setting the subcarrier group is described with reference to FIG. 7 to FIG. 16, and FIG. 17A and FIG. 17B.

As described above, the subcarrier group is set to include at least one pilot subcarrier and at least one data subcarrier. In the concrete example of the subcarrier group setting method described below, one pilot subcarrier is inserted for every four subcarriers in the frequency axis, in one period for every seven subcarriers in the time axis. The OFDM symbol represents a unit generated by one-time IFFT. One OFDM symbol includes a plurality of subcarriers. In FIG. 7 to FIG. 16, and FIG. 17A and FIG. 17B, the frequency axis represents the numbers of subcarriers in one OFDM symbol and the time axis represents the numbers of the OFDM symbols.

(First Method of Setting the Subcarrier Group)

Figure 7:
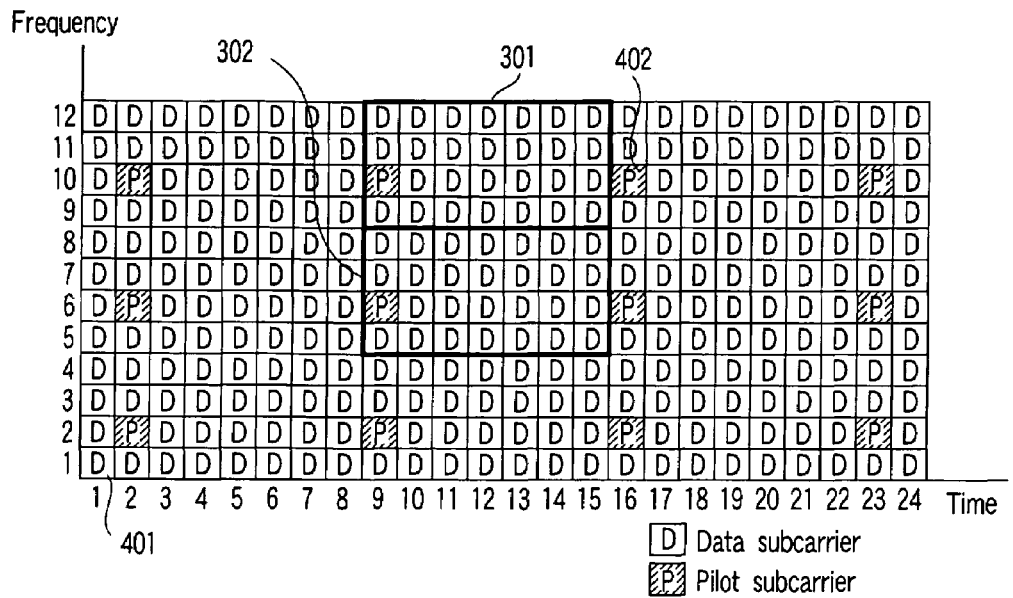
FIG. 7 is an illustration describing a first subcarrier group setting method.

In the first method of setting the subcarrier group, one subcarrier group is set by subcarriers in specific areas partitioned in square by the time axis and the frequency axis. In other words, one subcarrier group is set by subcarriers (pilot subcarriers and data subcarriers) included in a plurality of successive OFDM symbols. For example, the example shown in FIG. 7 is represented in the following formula. In FIG. 7, the location on the frequency axis is i, the location on the time axis is j, the location of the subcarrier 401 is (i, j)=(1, 1), the signal allocated to the subcarrier having location (i, j) is Si, j, a complex value multiplied by the signal allocated to the subcarriers in subcarrier group 301 is R[1], and a complex value multiplied by the signal allocated to the subcarriers in subcarrier group 302 is R[2]. The processing of multiplying the signals by one complex value in each subcarrier group is represented in the following formula.

$$S_{i,j} \cdot R(i,j) \quad (10)$$

$$R(i,j) = \begin{cases} r[\lfloor (i-1)/4 \rfloor] & (9 \leq j \leq 15 \text{ and } 5 \leq i \leq 12) \\ 1 & (\text{other}) \end{cases}$$

Figure 8:
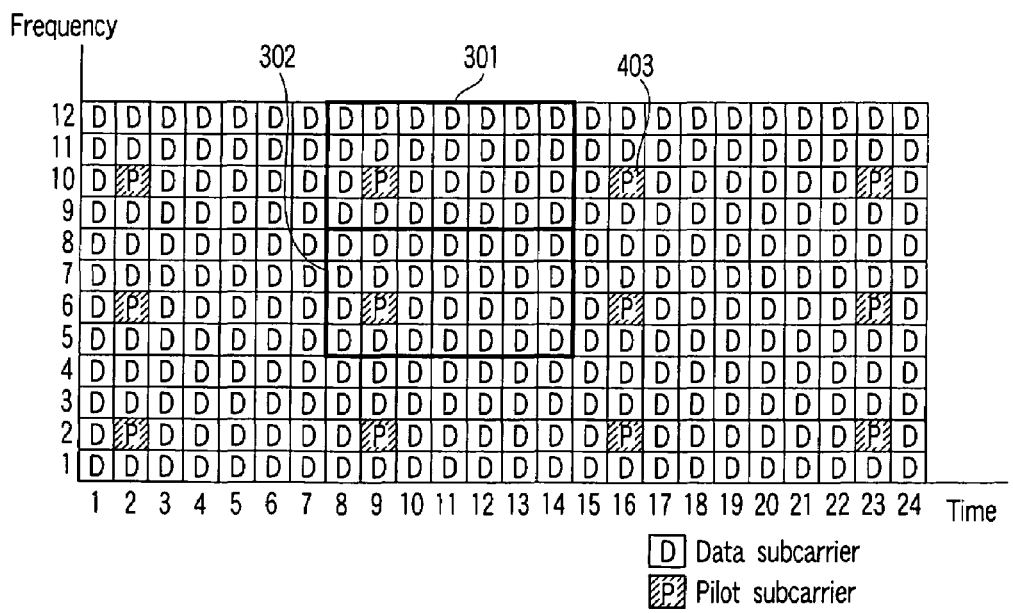
FIG. 8 is an illustration describing the first subcarrier group setting method.
Figure 9:
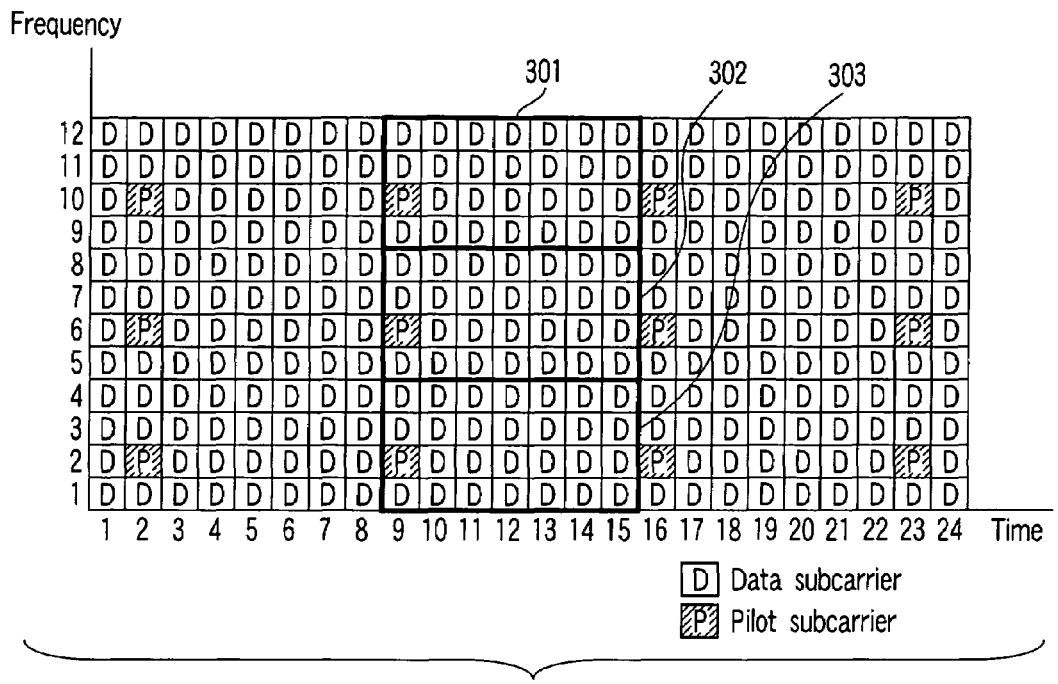
FIG. 9 is an illustration describing the first subcarrier group setting method.

The first method of setting the subcarrier group has a merit that in a case where the boundaries (for example, frame boundaries) are determined at constant subcarrier intervals on the frequency axis and the time axis, the subcarriers can easily be located such that the subcarrier groups do not cross the boundaries. For example, if one frame is formed of seven OFDM symbols, subcarrier groups 301 and 302, or subcarrier groups 301, 302 and 303 in square having four subcarriers in the frequency direction and seven subcarriers in the time direction are set as shown in FIG. 7, FIG. 8 and FIG. 9. Thus, the subcarrier groups can be generated not to cross the frame boundaries and one pilot subcarrier can be included in each of the subcarrier groups.

Figure 10:
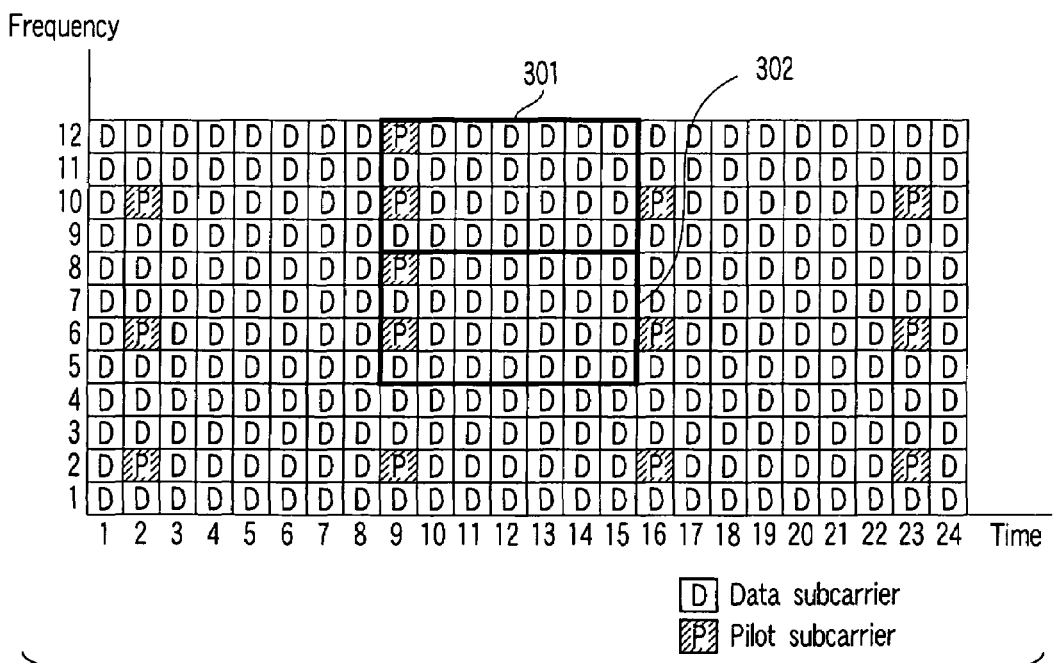
FIG. 10 is an illustration describing the first subcarrier group setting method.

In FIG. 7 and FIG. 8, the frame boundaries are present at the seventh and sixth frames from the OFDM symbol including the pilot subcarrier, respectively. FIG. 9 shows an example of aligning the subcarrier groups 301, 302 and 303 in the frequency direction in a time section, i.e. locating the subcarrier groups successively along the entire length of the OFDM symbols. In the example of FIG. 9, each of the subcarriers in the time section belongs to any one of the subcarrier groups 301, 302 and 303. Therefore, the macro-diversity reception can be conducted in each of the subcarriers at the OFDM receiver, in the time section. FIG. 10 shows an example of making the density of the pilot subcarriers which are present in the subcarrier groups 301 and 302 higher than the density of the pilot subcarriers outside the subcarrier groups. In the example of FIG. 10, the receiving performance of the data subcarriers in the subcarrier groups can be enhanced.

(Second Method of Setting the Subcarrier Group)

In the second method of setting the subcarrier group, one subcarrier group is set by a combination of the subcarriers (pilot subcarriers and data subcarriers) in the square areas partitioned by the time axis and the frequency axis, and at least one pilot subcarrier in these square areas or at least one pilot subcarrier that is the same in the location of the frequency direction as the data subcarrier and that is located outside the square areas so as to be different in the location of the time axis. In other words, the subcarrier group is set by the subcarriers (pilot subcarriers and data subcarriers) included in a plurality of successive OFDM symbols, and at least one pilot subcarrier in the plurality of successive OFDM symbols or the pilot subcarrier that has the same frequency as the data subcarriers and that is included in at least one OFDM symbol adjacent to the plurality of successive OFDM symbols.

Figure 11:
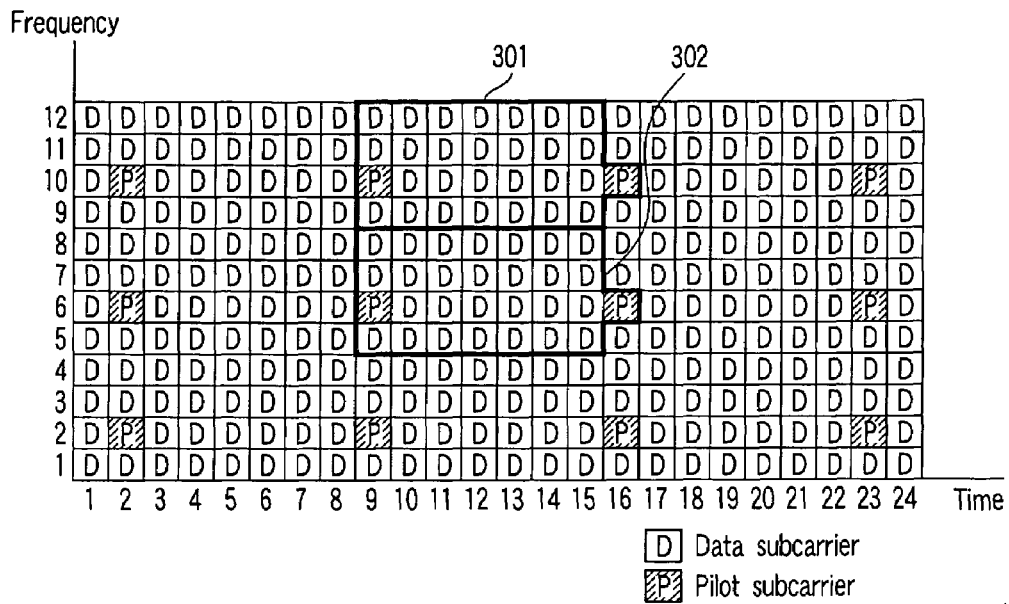
FIG. 11 is an illustration describing a second subcarrier group setting method.
Figure 12:
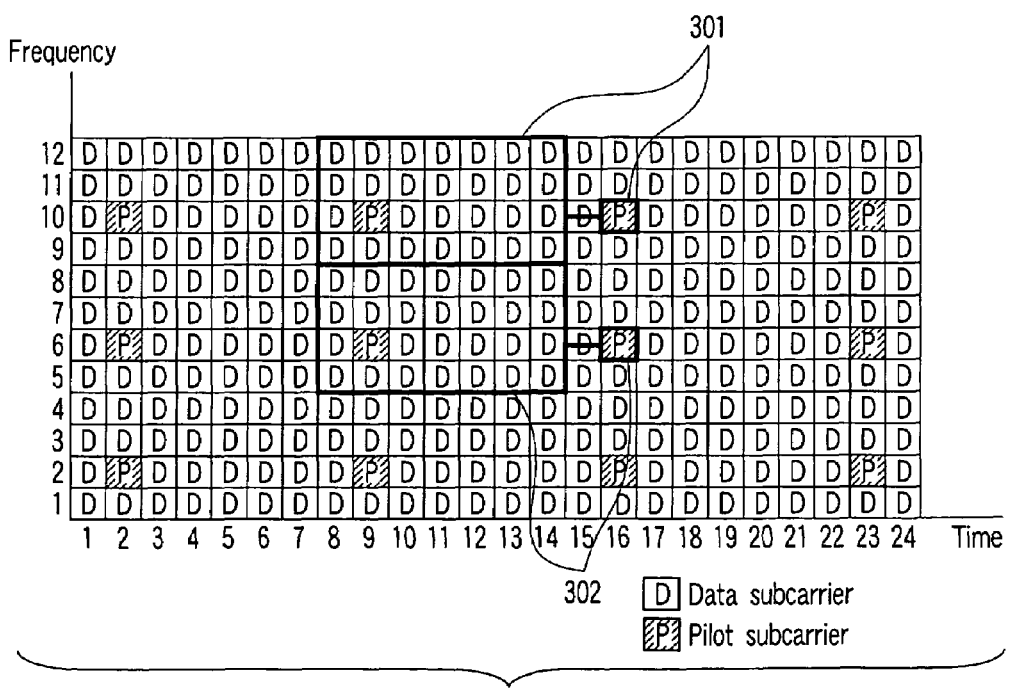
FIG. 12 is an illustration describing the second subcarrier group setting method.
Figure 13:
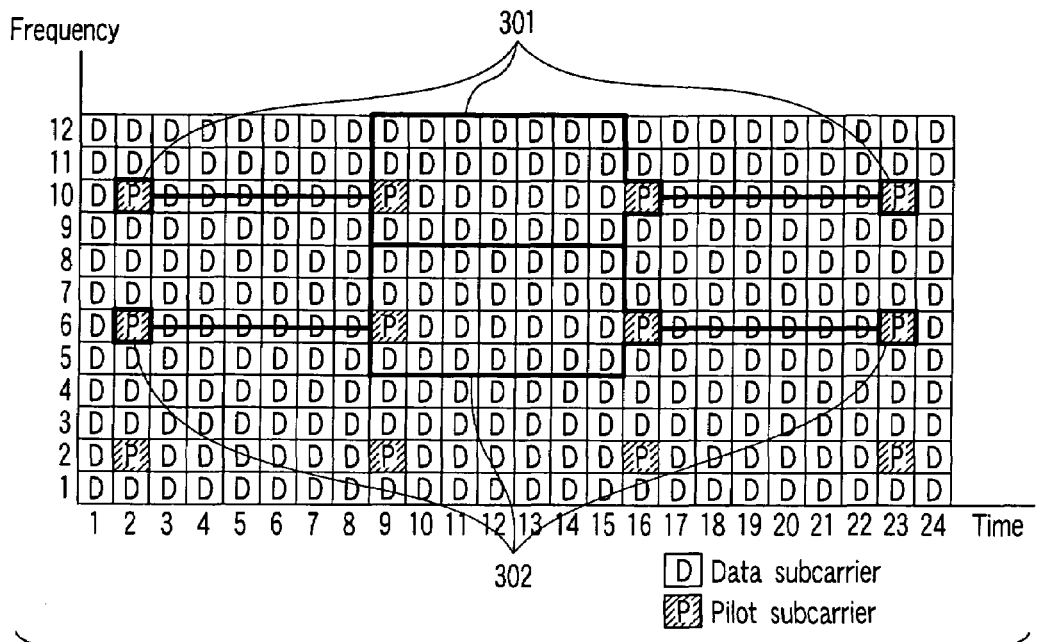
FIG. 13 is an illustration describing the second subcarrier group setting method.

For example, FIG. 11 shows the subcarrier groups 301 and 302 additionally including one pilot subcarrier that has the same location in the frequency direction as the pilot subcarriers which are present in the subcarrier groups (square areas) shown in FIG. 7 and that is in contact with the right side of the square areas. Similarly, FIG. 12 shows the subcarrier groups 301 and 302 additionally including one pilot subcarrier that has the same location in the frequency direction as the pilot subcarriers which are present in the subcarrier groups (square areas) shown in FIG. 8 and that is in the vicinity of the right side of the square areas. Moreover, FIG. 13 shows the subcarrier groups 301 and 302 additionally including two pilot subcarriers located before and after the subcarrier group of FIG. 11.

According to the second method of setting the subcarrier group, temporal variation of the channel response in the channel estimation conducted for each subcarrier group can be easily be estimated. Therefore, the channel estimation accuracy can be enhanced in a case where the variation is great.

If the second method of setting the subcarrier group is applied to the OFDM transmitter shown in FIG. 5, the range of the subcarrier group can also be interpreted in a different manner. In the OFDM transmitter shown in FIG. 5, the signals allocated to the subcarriers outside the subcarrier group are scrambled. If the complex value multiplied by the signals allocated to the subcarriers inside the subcarrier group 301 shown in FIG. 7 is set to be the same as the complex value employed to scramble the pilot signal allocated to the pilot subcarrier 402, the subcarrier group shown in FIG. 7 can be considered substantially the same as the subcarrier group shown in FIG. 11.

Similarly, if the complex value multiplied by the signals allocated to the subcarriers inside the subcarrier group 301 in FIG. 8 is set to be the same as the complex value employed to scramble the pilot signal allocated to the pilot subcarrier 403, the subcarrier group shown in FIG. 8 can be considered equivalent to the subcarrier group shown in FIG. 12.

Thus, by making the complex value multiplied by the signals allocated to the subcarriers in the subcarrier group the same as the complex value employed to scramble the pilot signal allocated to the subcarrier outside the subcarrier group, the pilot signal allocated to the subcarrier outside the subcarrier group can be handled equivalently to the pilot signal allocated to the subcarrier inside the subcarrier group. Therefore, the channel estimation accuracy of the channel corresponding to the subcarrier group can be enhanced.

The shape of the subcarrier group does not need to be a complete square. For example, subcarriers excluding some subcarriers that are less than a half of all the subcarriers inside the subcarrier group may form a square. Thus, a subcarrier group having a higher degree of freedom can be designed. If the degree of freedom in the subcarrier group needs to be further increased, the subcarriers inside the subcarrier group do not need to be in a shape similar to a square. In this case, for example, at least data subcarriers inside the subcarrier group may be successive in the frequency direction or the time direction. The correlation in channel distortion among the data subcarriers inside the subcarrier group is therefore increased and the channel equalization can easily be conducted.

Figure 14:
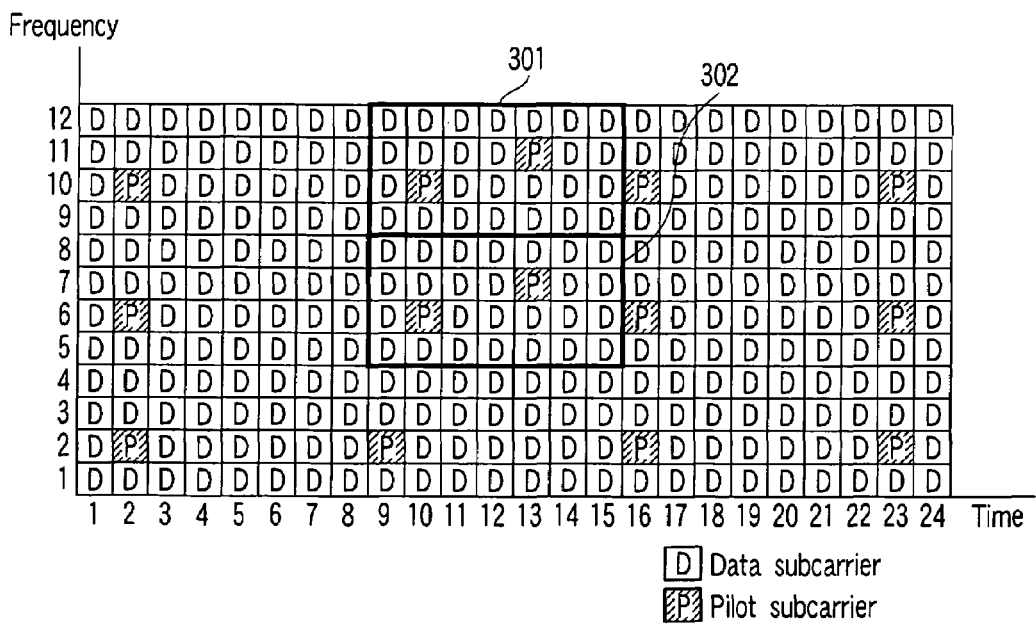
FIG. 14 is an illustration describing a method of locating pilot subcarriers in a subcarrier group.

Next, concrete examples of a method of locating the pilot subcarriers inside the subcarrier group are described with reference to FIG. 14, FIG. 15, and FIG. 16. In the example shown in FIG. 14, the pilot subcarriers inside the subcarrier group are uniformly dispersed in the time direction and the frequency direction. By dispersing the pilot subcarriers in the subcarrier group, the channel estimation following the variation in both the time direction and frequency direction of the channel response can be conducted.

Figure 15:
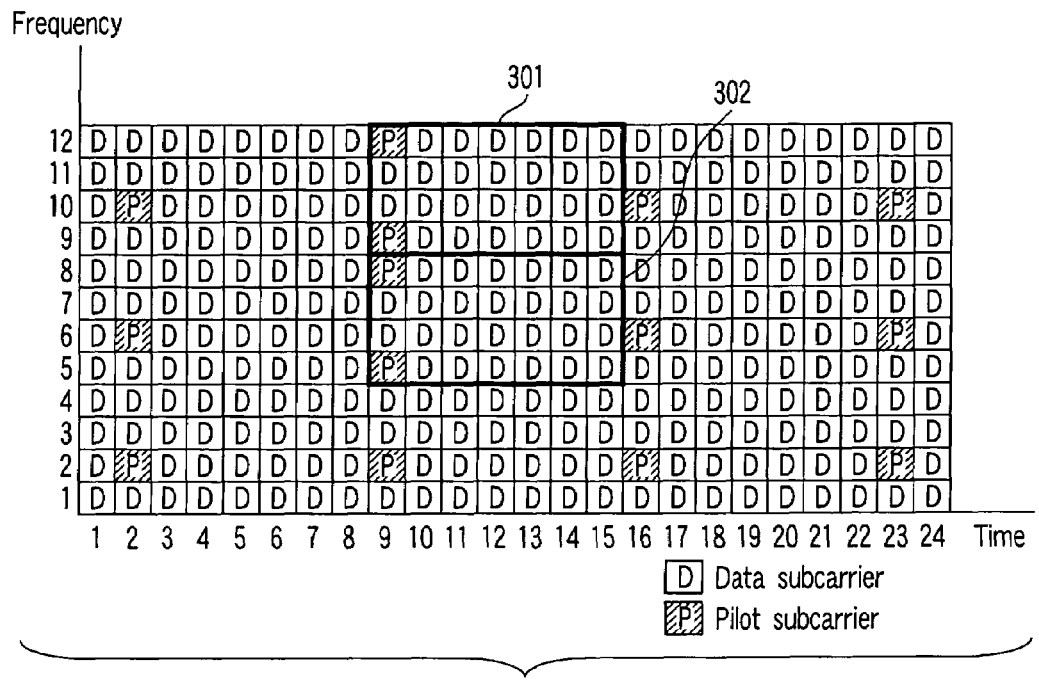
FIG. 15 is an illustration describing a method of locating pilot subcarriers in a subcarrier group.

In the example shown in FIG. 15, the pilot subcarriers are located on both ends of the frequency direction inside the subcarrier group, with priority. If the variation of the channel response in the frequency direction is great, the variation of the channel response is estimated by referring to the pilot signals allocated to the subcarriers inside the subcarrier group. When the channel estimation is conducted with the pilot signals, it is desirable to recognize the channel response even in the subcarrier locations (frequencies) to which no pilot signals are allocated, to exactly conduct the channel estimation. For this reason, it is necessary to obtain the pilot signals at the subcarrier locations to which no pilot signals are allocated, by interpolation or extrapolation. It is known that the channel estimation accuracy is lower by the extrapolation of the pilot signals than by the interpolation thereof. By locating the pilot subcarriers on both ends of the frequency direction inside the subcarrier group, with priority, as shown in FIG. 15, necessity of extrapolation of the pilot signals is reduced and, therefore, the channel estimation accuracy is enhanced.

Figure 16:
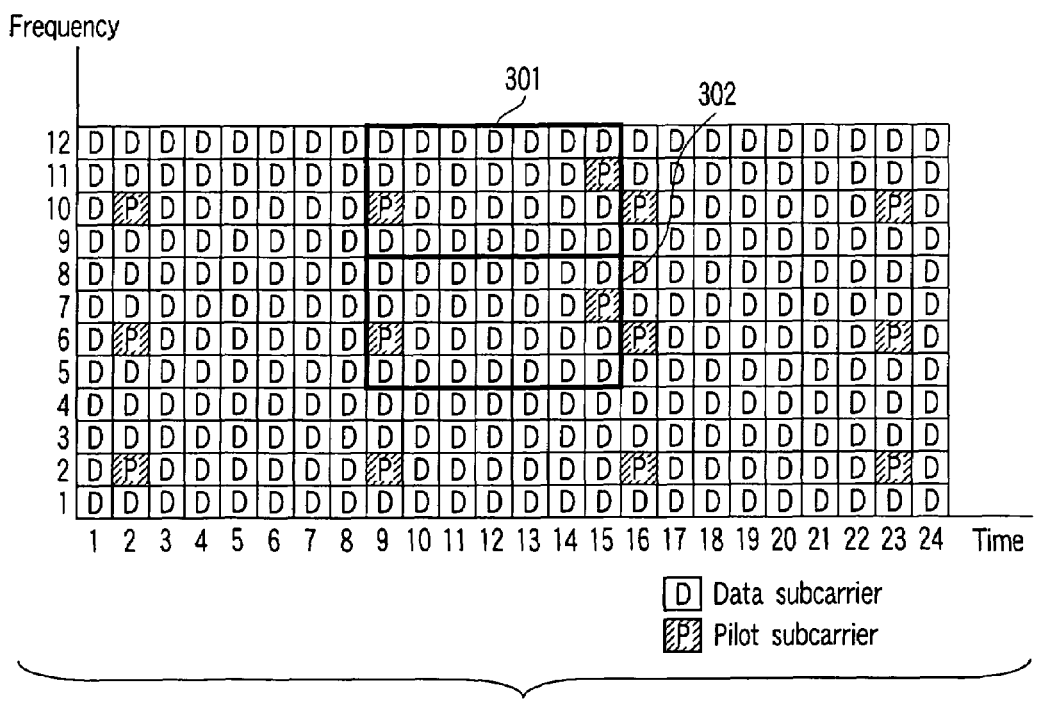
FIG. 16 is an illustration describing a method of locating pilot subcarriers in a subcarrier group.

In the example shown in FIG. 16, the pilot subcarriers are located on both ends of the time direction inside the subcarrier group, with priority. If the variation of the channel response in the time direction is great, necessity of extrapolation of the pilot signals is reduced and, therefore, the channel estimation accuracy is enhanced, for the same reason as the example of FIG. 15.

Next, examples of using complex value sequences different for the subcarrier groups are described with reference to FIG. 17A and FIG. 17B. Different sequences of the complex values may be selected or the same sequence of the complex values may be selected, in the OFDM transmitters. A concrete example of selecting different complex value sequences in the OFDM transmitters is described below.

Figure 17A:
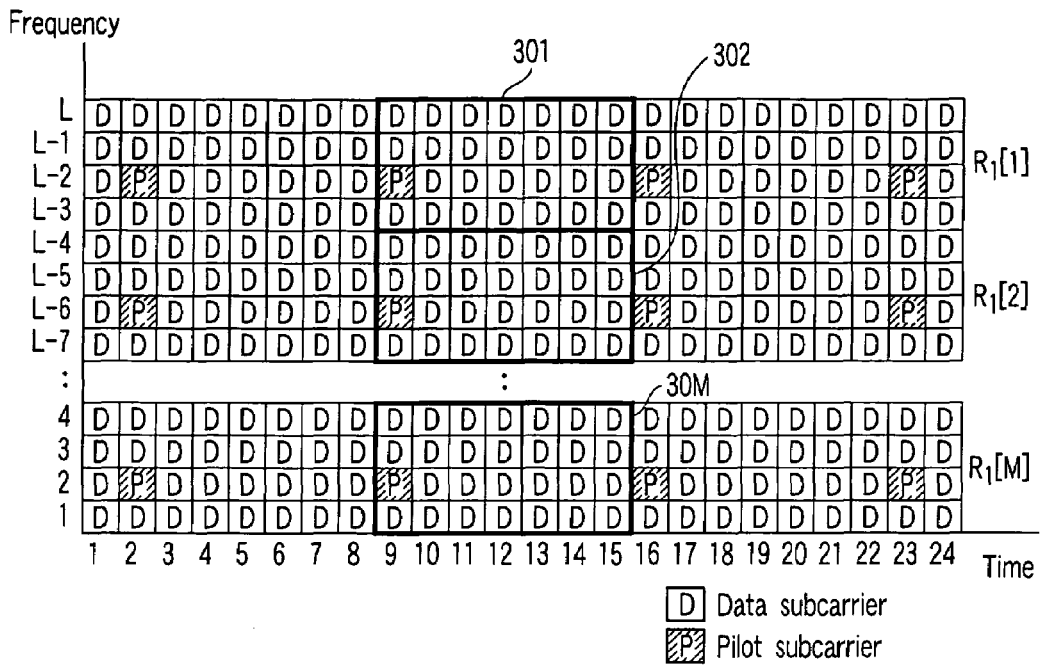
FIG. 17A and FIG. 17B are illustrations describing a complex number sequence defined in each subcarrier group.

FIG. 17A shows the subcarrier location of the OFDM signal transmitted from the OFDM transmitter 11 and the complex value sequence. FIG. 17B shows the subcarrier location of the OFDM signal transmitted from the OFDM transmitter 12 and the complex value sequence. The complex value sequence in FIG. 17A is R1[1], R1[2], ..., R1[N] and the complex value sequence in FIG. 17B is R2[1], R2[2], ..., R2[N]. In the OFDM transmitter shown in FIG. 5, the interference on the signals allocated to the subcarriers outside the subcarrier group can be reduced by scrambling the signals allocated to the subcarriers outside the subcarrier group. Unlike the signals allocated to the subcarriers included in the subcarrier group, the signals from the other OFDM transmitters become interference.

Figure 17B:
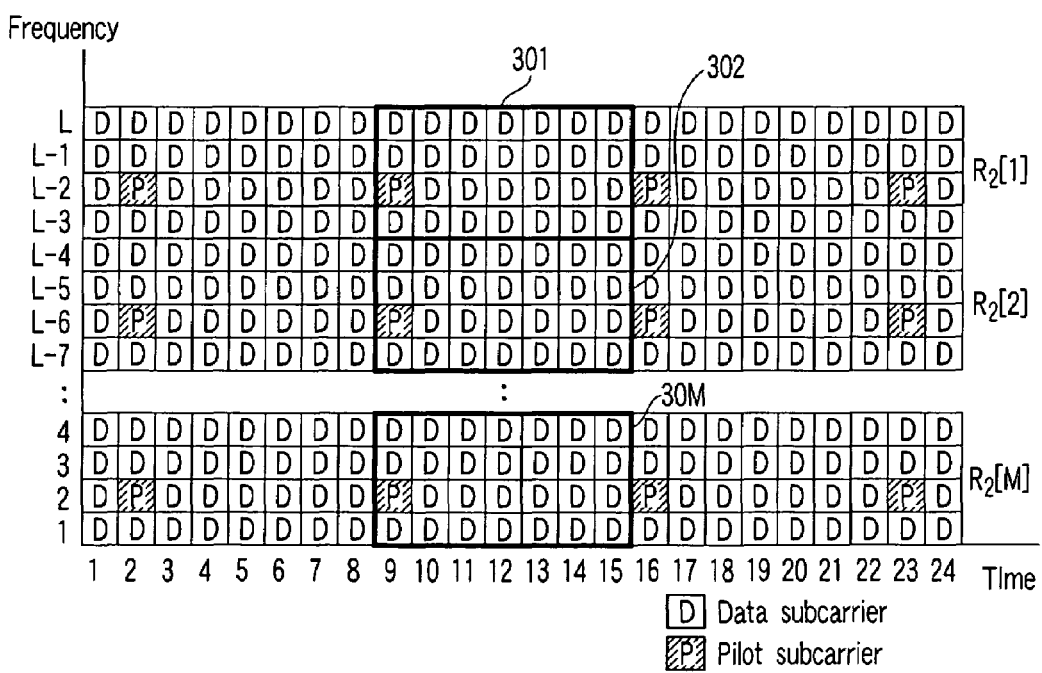

In the examples of FIG. 17A and FIG. 17B, the complex value sequences R1[1], R1[2], ..., R1[N] and R2[1], R2[2], ..., R2[N] is orthogonal to each other or pseudo-orthogonal to each other. Thus, the interference can be reduced in relation to the pilot signals allocated to the pilot subcarriers inside the subcarrier groups and the complex value sequences can be employed to the channel estimation which is not subjected to the macro-diversity reception. As explained above, "orthogonal to each other" means that the correlation value becomes zero and "pseudo-orthogonal to each other" means that the absolute value of the correlation value becomes smaller than the auto-correlation value. An auto-correlation value of a certain sequence $x[k]$ ($k=1, \ldots, K$) and a correlation value of two sequences $x[k]$, $y[k]$ ($k=1, \ldots, K$) are represented in the following formulae.

$$\sum_{k=1}^{K} x[k] \cdot x[k]^* \quad (11)$$

$$\sum_{k=1}^{K} x[k] \cdot y[k]^* \quad (12)$$

When the sequence length is 4, there are four sequences R1, R2, R3 and R4 as mentioned below as examples of complex value sequences having an orthogonal relationship among one another.

$R_1=\{+1,+1,+1,+1\}$ $R_2=\{+1,+1,-1,-1\}$ $R_3=\{+1,-1,-1,+1\}$ $R_4=\{+1,-1,+1,-1\}$ (13)

In four complex value sequences R1, R2, R3 and R4 of formula (13), all six correlation values are zero and orthogonal to one another. In general, if the sequence length is set at 2K, at most 2K complex value sequences having an orthogonal relationship among one another can be generated. As another examples, for example, in four complex value sequences R1, R2, R3 and R4 as represented in the following formula, $R_1=\{+i,+i,+i,+i\}$ $R_2=\{+i,+i,-i,-i\}$ $R_3=\{+i,-i,-i,+i\}$ $R_4=\{+i,-i,+i,-i\}$ (14)

all six correlation values are zero and orthogonal to one another.

On the other hand, as examples of complex value sequences having a pseudo-orthogonal relationship, there are six sequences R1, R2, R3, R4, R5, and R6 as represented in the following formula.

$R_1=\{+1,+1,+1,+1\}$ $R_2=\{+1,+1,-1,-1\}$ $R_3=\{+1,-1,-1,+1\}$ $R_4=\{+1,-1,+1,-1\}$ $R_5=\{+1,+1,+1,-1\}$ $R_6=\{+1,-1,+1,+1\}$ (15)

In six R1, R2, R3, R4, R5 and R6 of Formula 15 having a sequence length of 4, the auto-correlation value is 4 while the correlation value is 0 or 2. For example, six correlation values among R1, R2, R3 and R4, and the correlation value between R5 and R6 are zero while four correlation values between R1, R2, R3 and R4, and R5 and R6 are 2. Thus, by adding sequences having a pseudo-orthogonal relationship among one another, i.e. sequences whose correlation values are not limited to zero, to the complex value sequences, more sequences than the sequences having an orthogonal relationship among one another or sequences whose correlation values are limited to zero can be generated.

Figure 18:
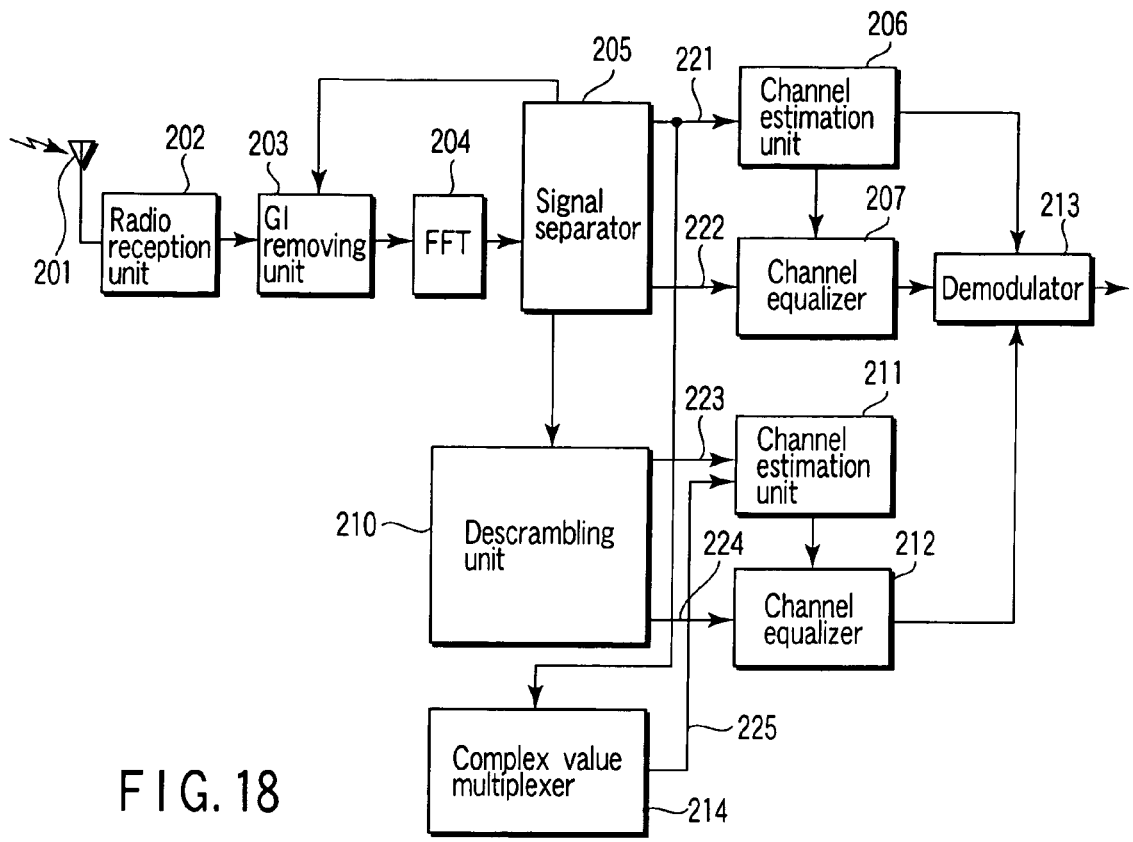
FIG. 18 is a block diagram showing the other example of the OFDM receiver.

FIG. 18 shows an OFDM receiver suitable for a case where the complex value sequences are orthogonalized or pseudo-orthogonalized in the transmitters. The OFDM receiver have differences to the OFDM receiver shown in FIG. 6 that the pilot signal 221 allocated to the pilot subcarrier in the subcarrier group is also input to a complex value multiplexer 214, that a pilot signal 225 multiplied by the complex value by the complex value multiplexer 214 is input to the channel estimation unit 211, and that the channel estimation unit 211 conducts the channel estimation on the pilot signal 223 and the pilot signal 225.

The signals allocated to the subcarriers inside the subcarrier group are basically processed in the same manner as that in the OFDM receiver shown in FIG. 6. In other words, the pilot signal 221 and the data signal 222 for each of the subcarrier groups, as output from the signal separator 205, are input to the channel estimation unit 206 and the channel equalizer 207, respectively. The data signal 222 is subjected to the channel equalization using the channel estimation value output from the channel estimation unit 206, by the channel equalizer 207. The data signal subjected to the channel equalization by the channel equalizer 207 is demodulated by the demodulator 213 and the bit string which is the original of the data signal is thereby regenerated.

The signals allocated to the subcarriers outside the subcarrier group are also processed in the same manner as that in the OFDM receiver shown in FIG. 6. In other words, the pilot signals and data signals output from the signal separator 205, as allocated to the subcarriers outside the subcarrier group, are descrambled by the descrambling unit 210. The descrambling unit 210 conducts the descrambling in the descrambling pattern which is opposite to the scrambling pattern employed in the OFDM transmitters transmitting the signals to be received by the OFDM receiver. The pilot signal 223 descrambled by the descrambling unit 210 is input to the channel estimation unit 211 and the data signal 224 descrambled by the descrambling unit 210 is input to the channel equalizer 212.

On the other hand, the pilot signal 221 output from the signal separator 205, as allocated to the pilot subcarrier inside the subcarrier group, is further multiplied by the complex value by the complex value multiplexer 214. The complex value multiplexer 214 multiplies the pilot signal 221 by a complex value corresponding to the complex conjugate of the complex value used in the complex value multiplier 105 shown in FIG. 5 provided in the OFDM transmitter which transmits the signal to be received by the OFDM receiver. The pilot signal 225 multiplied by the complex value by the complex value multiplexer 214 is input to the channel estimation unit 211.

The channel estimation unit 211 conducts the channel estimation by the averaging and interpolation of the adjacent pilot signal and then calculates a channel estimation value representing a channel response. The channel equalizer 212 conducts the channel equalization for the descrambled data signal by using the channel estimation value output from the channel estimation unit 211. The data signal subjected to the channel equalization, as output from the channel equalizer 212, is input to the demodulator 213, and a bit string which is the original of the data signal is thereby regenerated.

By the averaging conducted by the channel estimation unit 211, the power can be made small and the accuracy in the desired channel estimation value can be enhanced in relation to the pilot signals transmitted from the OFDM transmitters different in scrambling pattern.

Moreover, in the channel estimation unit 211, the channel estimation is conducted by using the pilot signal 225 that is multiplied by the complex value by the complex value multiplexer 214 and that is allocated to the subcarriers inside the subcarrier group, together with the pilot signal 223 that is descrambled by the descrambling unit 210 and that is allocated to the subcarriers outside the subcarrier group. Therefore, since more pilot signals can be used for the channel estimation in the second channel estimation unit 211 as compared with the OFDM receiver shown in FIG. 6, the accuracy in the channel estimation can be further enhanced.

(Method of Setting Guard Interval Length)

Next, a method of setting the length of the guard interval added by the GI adder 107 shown in FIG. 2 or FIG. 5 is described. The guard interval is added by copying a part of the time waveform for each OFDM symbol. By adding the guard interval to the OFDM symbol, the inter symbol interference caused by a delay Signals can be reduced. In general, as greater the guard interval length is, as more the OFDM symbol can endure a multipath environment having great delay expansion (also called delay profile).

As described above, the signals allocated to the subcarriers inside the subcarrier group can be subjected to macro-diversity reception in the OFDM receiver 20. In this case, since the OFDM receiver 20 receives the signals from the OFDM transmitters 11, 12, . . . , 1N together, the delay expansion may be relatively greater as compared with the reception of the signal from one transmitter.

Thus, the receiving performance is improved by setting the guard interval of the OFDM symbol including the subcarriers inside the subcarrier group to be longer than that of the other OFDM symbols. More specifically, the subcarrier location information representing the locations of the subcarriers inside the subcarrier group is given to the GI adder 107 from the subcarrier group setting unit 104 as shown in FIG. 2 and FIG. 5. When the OFDM symbol including the subcarriers inside the subcarrier group is input from the IFFT unit 106, the GI adder 107 adds to the OFDM signal a longer guard interval as compared with that in a case where the OFDM symbol including the subcarriers outside the subcarrier group is input, on the basis of the subcarrier location information.

Thus, by setting the guard interval length, the OFDM receiver 20 can respond to great delay expansion occurring at the macro-diversity reception and the receiving performance can be improved.

Next, a concrete example of setting the guard interval length is described. For example, in the example of setting the subcarrier group shown in FIG. 7, the guard interval length for seven OFDM symbols including the subcarriers which are present in the subcarrier group is set to be greater than the guard interval length for the OFDM symbols including no subcarriers which are present in the subcarrier group. On the other hand, in the example of setting the subcarrier group shown in FIG. 11, the guard interval length for seven OFDM symbols including the data subcarriers which are present in the subcarrier group is set to be greater than the guard interval length for the OFDM symbols including no data subcarriers which are present in the subcarrier group. In addition, in the example shown in FIG. 11, the guard interval length for eight OFDM symbols including the data subcarriers or pilot subcarriers which are present in the subcarrier group may be set to be greater than the guard interval length for the OFDM symbols including no subcarriers which are present in the subcarrier group.

Figure 19:
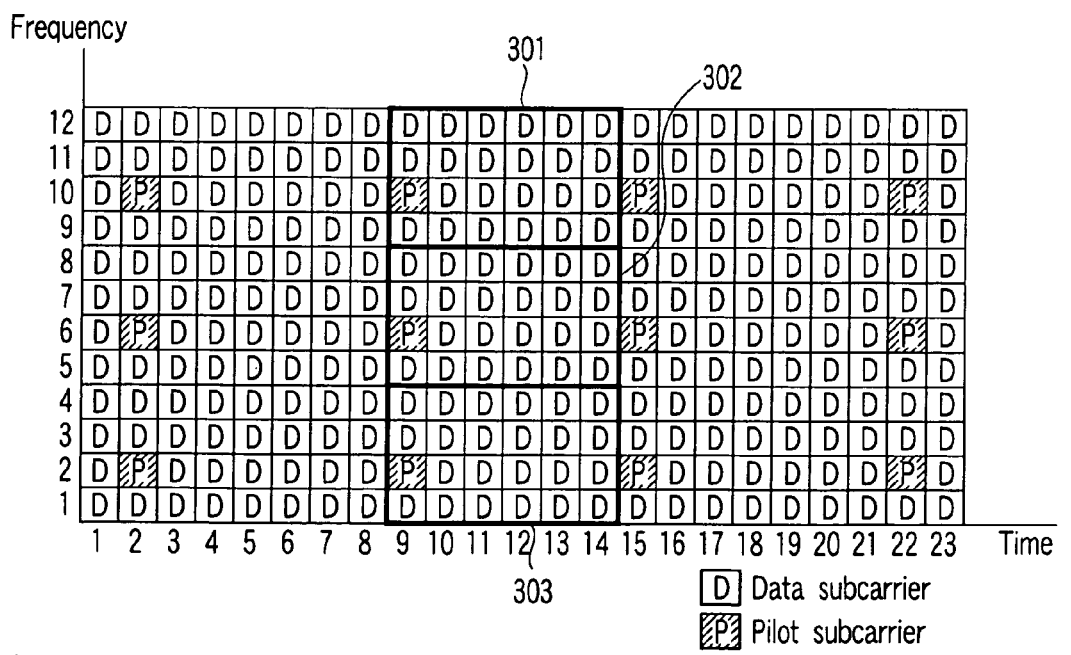
FIG. 19 is an illustration describing a method of setting a guard interval length.

In an example of setting the subcarrier group shown in FIG. 19, the guard interval length of the OFDM symbols including the subcarriers which are present in the subcarrier group is made greater than the OFDM symbols including no data subcarriers which are present in the subcarrier group. The OFDM symbols including the subcarriers which are present in the subcarrier group may be decimated.

Figure 20:
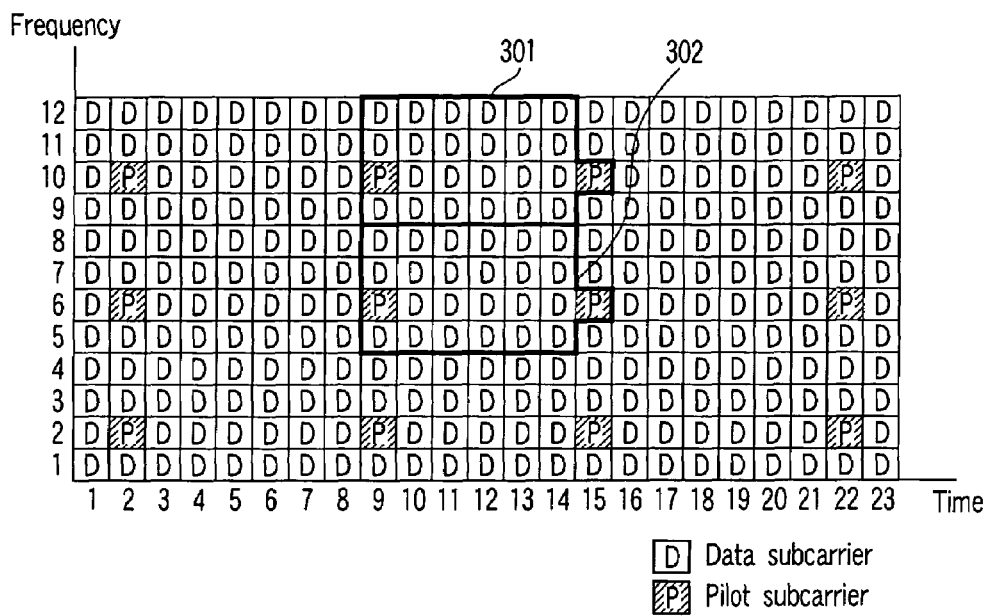
FIG. 20 is an illustration describing a method of setting a guard interval length.

In an example of setting the subcarrier group shown in FIG. 20, the guard interval length of the OFDM symbols including the data subcarriers and the pilot subcarriers which are present in the subcarrier group is made greater than the OFDM symbols including no subcarriers which are present in the subcarrier group. The OFDM symbols including the data subcarriers and the pilot subcarriers which are present in the subcarrier group may be decimated.

Figure 21:
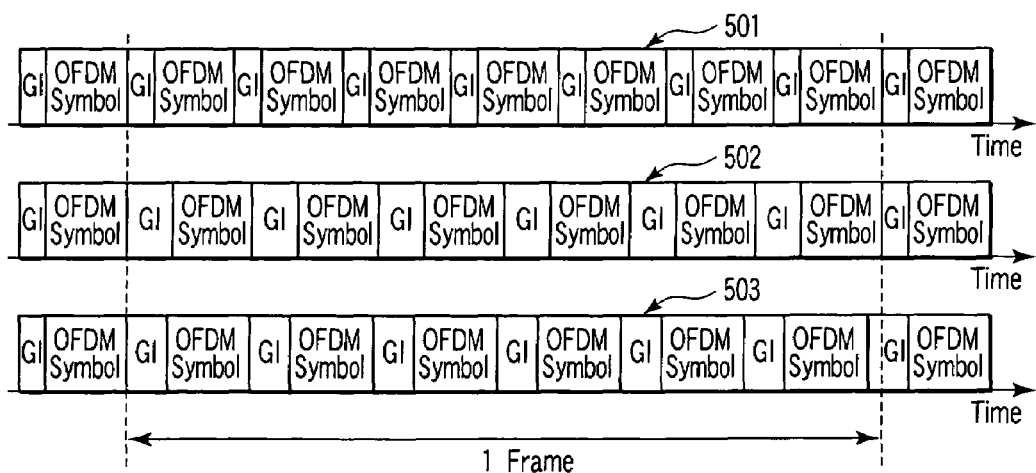
FIG. 21 is an illustration describing an example of setting a guard interval length in a case of decimating an OFDM symbol.

Next, an example of setting the guard interval length in a case of decimating the OFDM symbols as explained above is described with reference to FIG. 21. It is assumed that in the general guard interval length, one frame is formed of seven OFDM symbols as represented by a frame structure 501 shown in FIG. 21. For example, if one frame includes the OFDM symbols whose guard interval length is greater than that of the other OFDM symbols as shown in FIG. 19, at least one OFDM symbols may be decimated to make the guard interval length greater as represented in a frame structure 502.

In FIG. 20, if the OFDM symbols whose guard interval length is greater than that of the other OFDM symbols is not included within one frame, similarly to a case where the guard interval length of the OFDM symbol including the data subcarriers and pilot subcarriers which are present in the subcarrier group is greater than the other OFDM symbols, a part of the frame is added to the guard interval of the first OFDM symbol of the subsequent frame as represented in a frame structure 503. Thus, the guard interval length of the first OFDM symbol can be set to be great without decimating the OFDM symbol in the subsequent frame.

(Contents of Data Signal)

Next, contents of the data signal allocated to the data subcarrier which is present in the subcarrier group is described. For example, the OFDM transmitter shown in FIG. 2 or FIG. 5 is a base station of the cellular system (cellular telephone system) while the OFDM receiver shown in FIG. 4, FIG. 6 or FIG. 18 serves as a terminal. The base station may form a plurality of sectors. In this case, the base station includes the OFDM transmitters of some sectors. The data signal is used for broadcast communication, multi-cast communication, or soft handover.

First, examples of conducting the broadcast communication and the multicast communication are described. Transmission is conducted by allocating the same data signal from a plurality of base stations to the data subcarriers which are present in the subcarrier group. In this case, all the terminals connected to the base stations can simultaneously receive the same data signal. Therefore, the cellular system can conduct the broadcast communication and the multicast communication by employing the subcarriers which are present in the subcarrier group. The broadcast communication is the service of transmitting the data signal without specifying the users. The multicast communication is the service of transmitting the same data signal to at least two specific terminals. The broadcast communication and the multicast communication are often called Multimedia Broadcast and Multicast Services (MBMS) communications. The service of transmitting the data to a single specific terminal is called unicast.

Thus, the broadcast communication and the multicast communication can be employed for the subcarriers which are present in the subcarrier group while the unicast communication can be employed for the subcarriers outside the subcarrier group. The example of transmitting the data signal by the broadcast communication and the multicast communication is streaming of moving image data and music data, batch transmission of electronic mails, etc.

Next, the example of conducting the soft handover is described. The same data signal is transmitted from a plurality of base stations to the data subcarriers which are present in the subcarrier group. In this case, a terminal on the cell boundary can simultaneously receive signals from a plurality of base stations which are in contact with the boundaries. Therefore, the cellular system can implement the soft handover in the manner described below, by taking advantage of the data signals allocated to the subcarriers which are present in the subcarrier group.

First, when the terminal is present in the vicinity of the center of the cell of the first base station, the terminal conducts the general reception for the data signals allocated to the subcarriers outside the subcarrier group as set in the first base station. Next, when the terminal moves in the vicinity of the boundary between the cell of the first base station and the cell of the second base station adjacent to the first base station, the terminal conducts the macro-diversity reception, for the data signals allocated to the subcarriers which are present in the subcarrier group as set in each of the first base station and the second base station. After that, when the terminal moves in the vicinity of the center of the cell of the second base station, the terminal conducts the general reception for the data signals allocated to the subcarriers outside the subcarrier group as set in the second base station. Thus, the soft handover can be conducted by using the data signals allocated to the subcarrier group.

Figure 22:
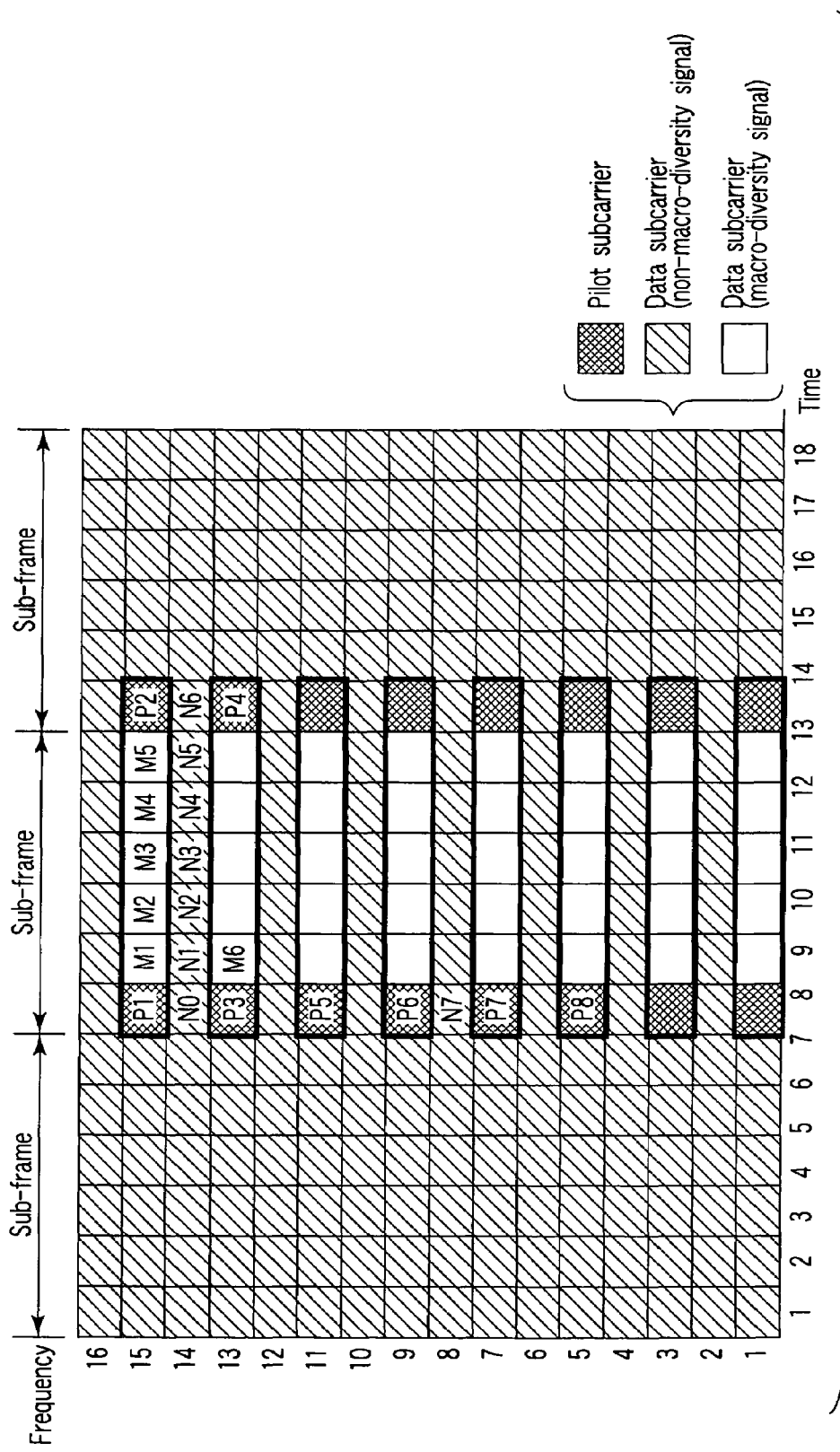
FIG. 22 is an illustration describing subcarrier allocation and settings of subcarrier groups in the OFDM transmitter.

Next, the subcarrier allocation and the subcarrier group setting as shown in FIG. 22 are described. In FIG. 22, each subcarrier group is formed of frequencies of the subcarriers to which the pilot signals are allocated. In other words, the OFDM symbols are aligned in a row along the time axis representing the transmission timing. In the OFDM symbols thus aligned, pilot signals are located at the subcarriers of the timings of both ends while macro-diversity signals are located at the subcarriers of the timings therebetween. The subcarrier group having such a configuration is located along the longitudinal frequency axis and non-macro-diversity signals are located between the subcarrier groups.

The macro-diversity signal is one of the data signals to which the macro-diversity is applied. The non-macro-diversity signal is one of the data signals to which the macro-diversity is not applied. In the OFDM transmitter shown in FIG. 5, for example, the subcarrier allocation is conducted by the subcarrier allocating unit 103 and the subcarrier group setting is conducted by the subcarrier group setting unit 104.

Next, the macro-diversity reception in a case of conducting the subcarrier allocation and the subcarrier group setting as shown in FIG. 22 is described. The following descriptions are focused on a case of conducting the macro-diversity reception by the OFDM receiver shown in FIG. 23.

An RF signal received by the antenna 201 is converted into a baseband digital signal by the radio reception unit 202 comprising a low-noise amplifier, a down-converter, an AD converter, etc. After the guard interval is removed from the baseband digital signal by the GI removing unit 203, the time-area signal is divided into frequency-area signals, i.e. signals for the respective subcarriers, by the fast Fourier transform (FFT) unit 204. The output signals from the FFT unit 204 are input to the signal separator 205.

The signal separator 205 separates the pilot signal 221 and the data signal 222 allocated to the subcarriers which are present in the subcarrier group. The separated pilot signal 221 is input to a channel estimation unit 206a and the complex value multiplexer 214 while the separated data signal 222 is input to the channel equalizer 207.

The data signals allocated to the subcarriers outside the subcarrier group are output from the signal separator 205 to a descrambling unit 210a. Since the pilot signals are not allocated outside the subcarrier group in the example of FIG. 22, the data signals alone are output from the signal separator 205 to the descrambling unit 210a as explained above.

The channel estimation unit 206a conducts the channel estimation by conducting the averaging or interpolation of the pilot signal 221 for each of the subcarrier groups, and then outputs a channel estimation value representing a channel response of each macro-diversity signal. In FIG. 22, the channel estimation unit 206a obtains the channel estimation value of each of macro-diversity signals M1 to M5, for example, on the basis of the pilot signals P1, P2 of which the channel estimation unit 206a is notified as the pilot signal 221.

The channel equalizer 207 conducts the channel equalization for the data signal 222 by using the channel estimation value output from the channel estimation unit 206a. The data signal subjected to the channel equalization is demodulated by the demodulator 213 and a bit string which is an original of the macro-diversity signal is thereby regenerated.

On the other hand, the data signals allocated to the subcarriers outside the subcarrier group are descrambled by the descrambling unit 210a. The descrambling unit 210a conducts the descrambling in a descrambling pattern which is opposite to the scrambling pattern employed in the OFDM transmitter transmitting the signal to be received by the OFDM receiver. The data signal 224 descrambled by the descrambling unit 210a is input to the channel equalizer 212.

The pilot signal 221 which is output from the signal separator 205 and which is allocated to the pilot subcarrier in the subcarrier group is multiplied by a complex value by the complex value multiplexer 214. The complex value multiplexer 214 multiplies the pilot signal 221 by a complex value corresponding to the complex conjugate of the complex value used in the complex value multiplier 105 shown in FIG. 5 provided in the OFDM transmitter which transmits the signal to be received by the OFDM receiver. The pilot signals of the respective OFDM transmitters 11 to 1N shown in FIG. 1 are thereby separated. The pilot signal 225 multiplied by the complex value by the complex value multiplexer 214 is input to the channel estimation unit 211a.

The channel estimation unit 211a conducts the channel estimation by the averaging and interpolation of the adjacent pilot signal and then calculates a channel estimation value representing a channel response, on the basis of the pilot signal 225 multiplied by the complex value.

With reference to FIG. 22, the channel estimation unit 211a obtains the channel estimation value of non-macro-diversity signal N0, on the basis of pilot signals P1, P3 of which the channel estimation unit 211a is notified as the pilot signal 221. Similarly, the channel estimation unit 211a obtains the channel estimation value of non-macro-diversity signal N6, on the basis of pilot signals P2, P4. Furthermore, on the basis of the channel estimations value of the non-macro-diversity signals N0, N6 thus obtained, the channel estimation unit 211a conducts the channel estimation by the averaging and interpolation of the non-macro-diversity signals N1 to N5 and calculates the channel estimation value representing the channel response of each of the non-macro-diversity signals N1 to N5.

The channel equalizer 212 conducts the channel equalization for the descrambled data signal by using the channel estimation value output from the channel estimation unit 211a. The data signal subjected to the channel equalization, as output from the channel equalizer 212, is input to the demodulator 213, and a bit string which is the original of the non-macro-diversity signal is thereby regenerated.

In the radio communications system having the above-described configuration, the OFDM transmitter conducts the transmission by allocating at least one pilot signal to each of the subcarrier group, allocating the non-macro-diversity signals to the frequencies outside the subcarrier group and locating no pilot subcarriers to these frequencies, as shown in FIG. 22.

The OFDM receiver conducts the channel estimation based on the pilot signals which are present in the same subcarrier group, for the macro-diversity signals, and conducts the channel estimation based on the pilot signals or the channel estimation based on the results of the channel estimation of the other non-macro-diversity signals, for the non-macro-diversity signals outside the subcarrier group.

Therefore, since the pilot signals do not need to be subjected to overhead outside the subcarrier group, similarly to the subcarrier allocation and the subcarrier group setting shown in FIG. 7 or FIG. 8, in order to conduct the channel estimation of the non-macro-diversity signals, the transmission efficiency can be enhanced.

Figure 24:
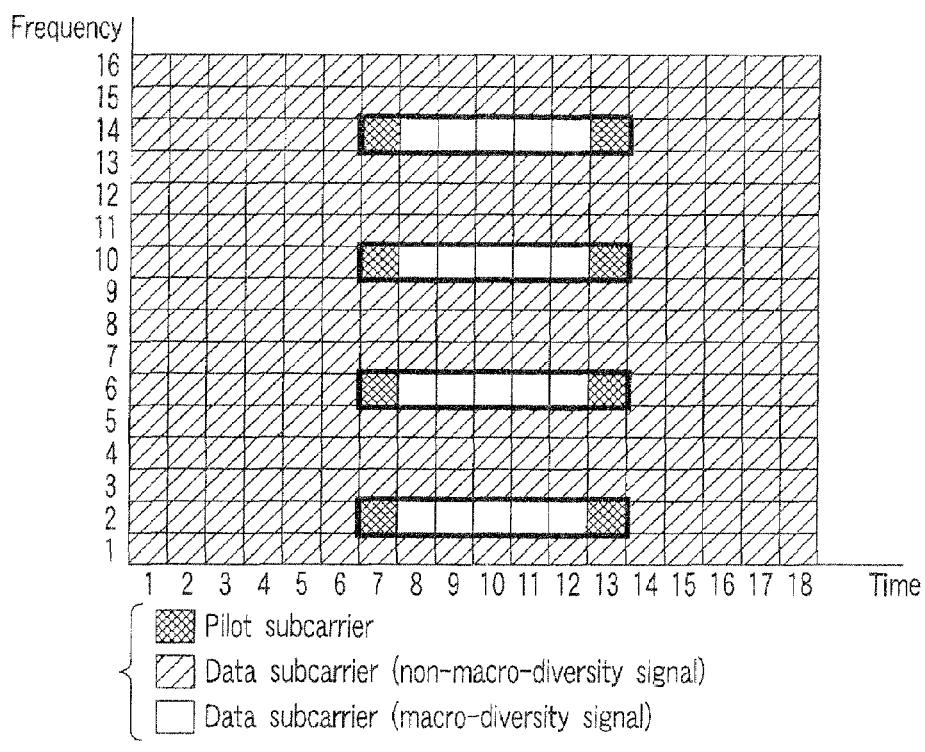
FIG. 24 is an illustration of a modified example of the subcarrier location shown in FIG. 22.

The subcarrier allocation and the subcarrier group setting are not limited to those shown in FIG. 22. Since the channel estimation of the non-macro-diversity signals is obtained not from the subcarrier group, but by interpolating and averaging at least one pilot subcarrier in the vicinity, the channel estimation can also be applied to a case where the subcarriers having a plurality of frequency locations are present in the subcarrier groups as shown in FIG. 24. Similarly, the subcarrier groups different in time may be located at the same frequency location as shown in FIG. 25.

Figure 26:
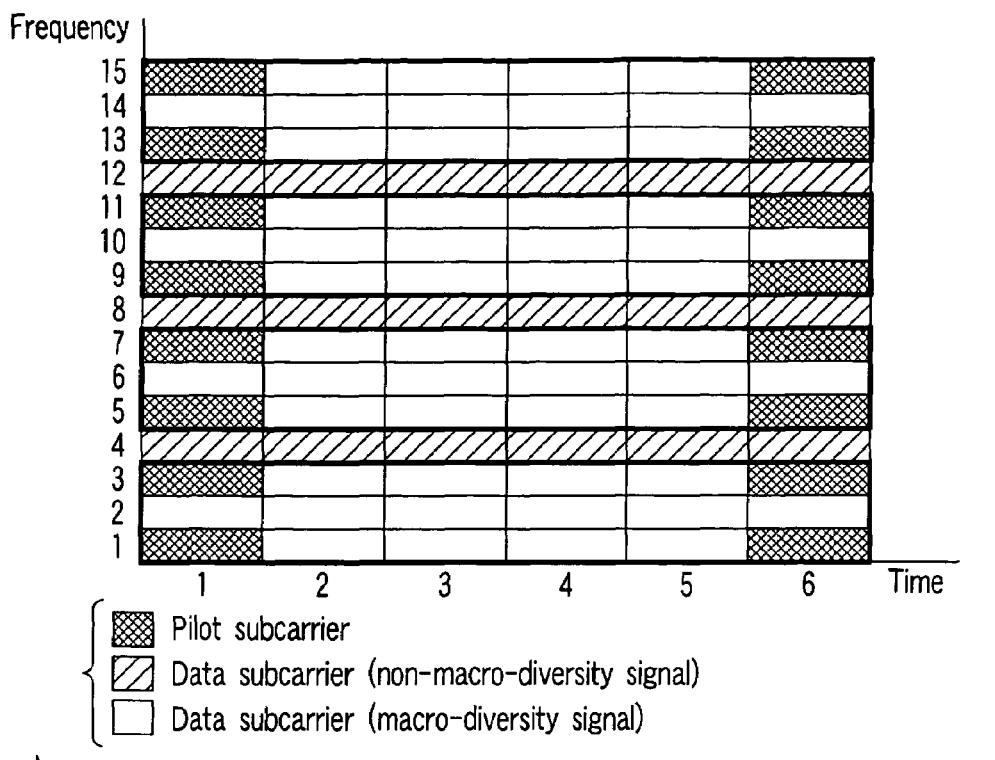
FIG. 26 is an illustration of a modified example of the subcarrier location shown in FIG. 22.
Figure 27:
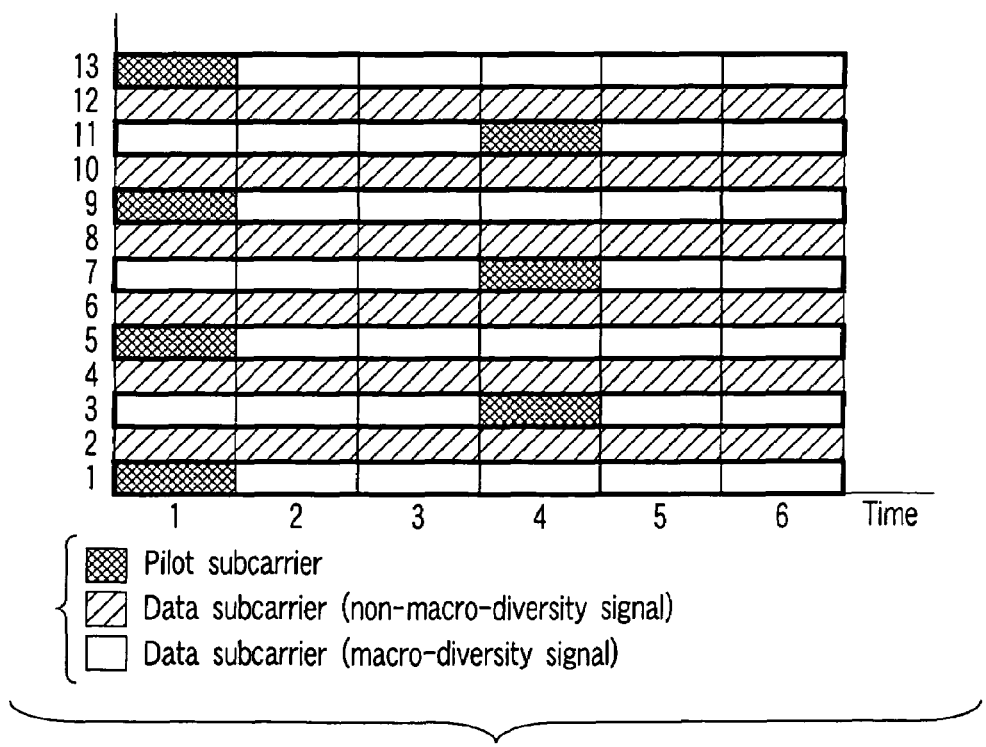
FIG. 27 is an illustration of a modified example of the subcarrier location shown in FIG. 22.

The channel estimation can also be applied to a case where the pilot subcarriers having a plurality of frequency locations are included in the subcarrier groups as shown in FIG. 26. Thus, the channel estimation accuracy in the subcarrier groups can be enhanced by the interpolation or extrapolation. Furthermore, the channel estimation can also be applied to a case where the pilot subcarriers are located at symbol times different in subcarrier group as shown in FIG. 27. Thus, channel following capability in the time direction can be enhanced in the channel estimation outside the subcarrier groups.

Figure 23:
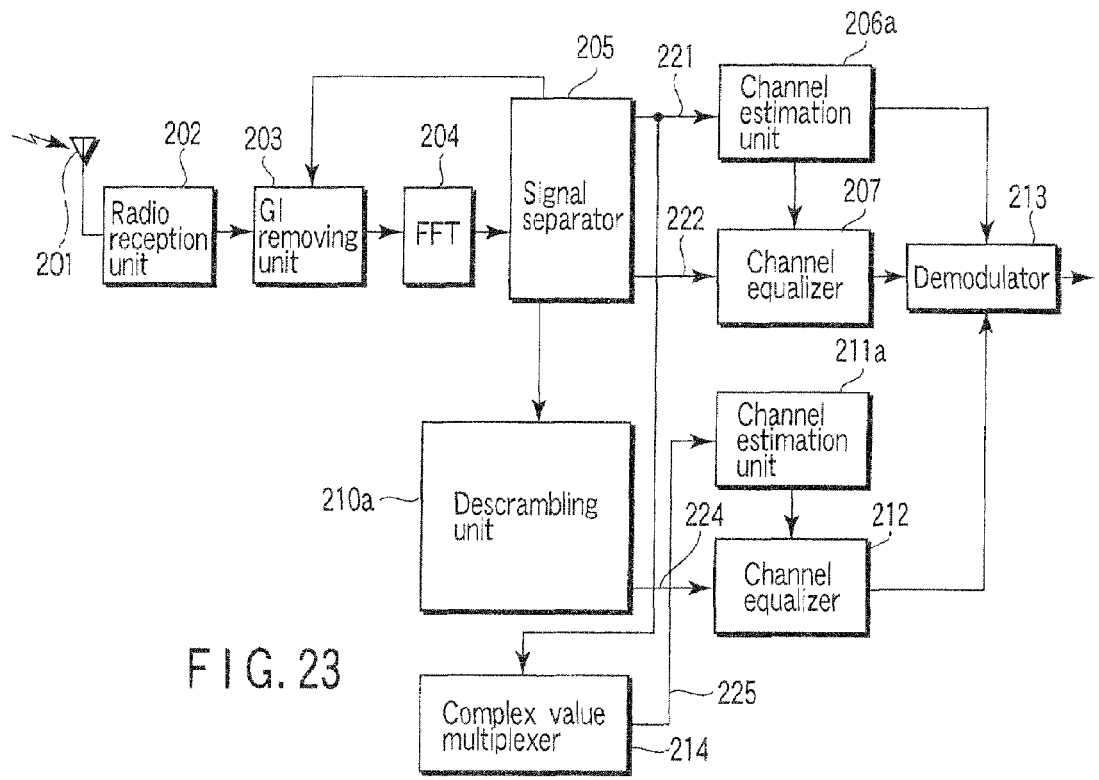
FIG. 23 is a block diagram of an OFDM receiver receiving an OFDM signal in a subcarrier location shown in FIG. 22.

In any of these cases, the pilot signals are not required outside the subcarrier groups, but the channel estimation of the data subcarriers outside the subcarrier groups can be conducted in the receiver configuration shown in FIG. 23 by using the pilot subcarriers in the adjacent subcarrier group.

Figure 28:
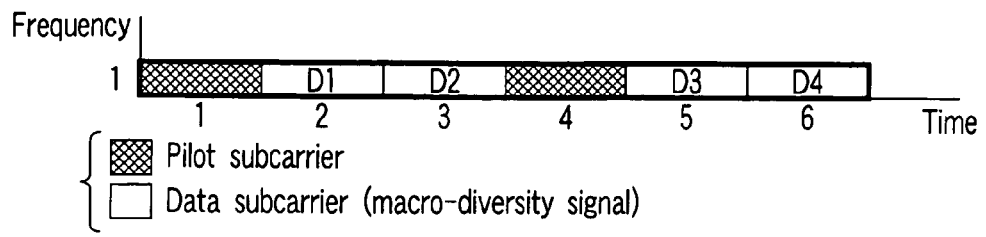
FIG. 28 is an illustration of a modified example of the subcarrier location shown in FIG. 22.

If a plurality of pilot subcarriers are located in the subcarrier group as shown in FIG. 28, the pilot signals do not need to be located on both ends of the subcarrier group. By locating the pilot signals at the locations other than the both ends of the subcarrier group, the data subcarriers D1, D2 can be received with a higher accuracy than the data subcarriers D3, D4.

Figure 29:
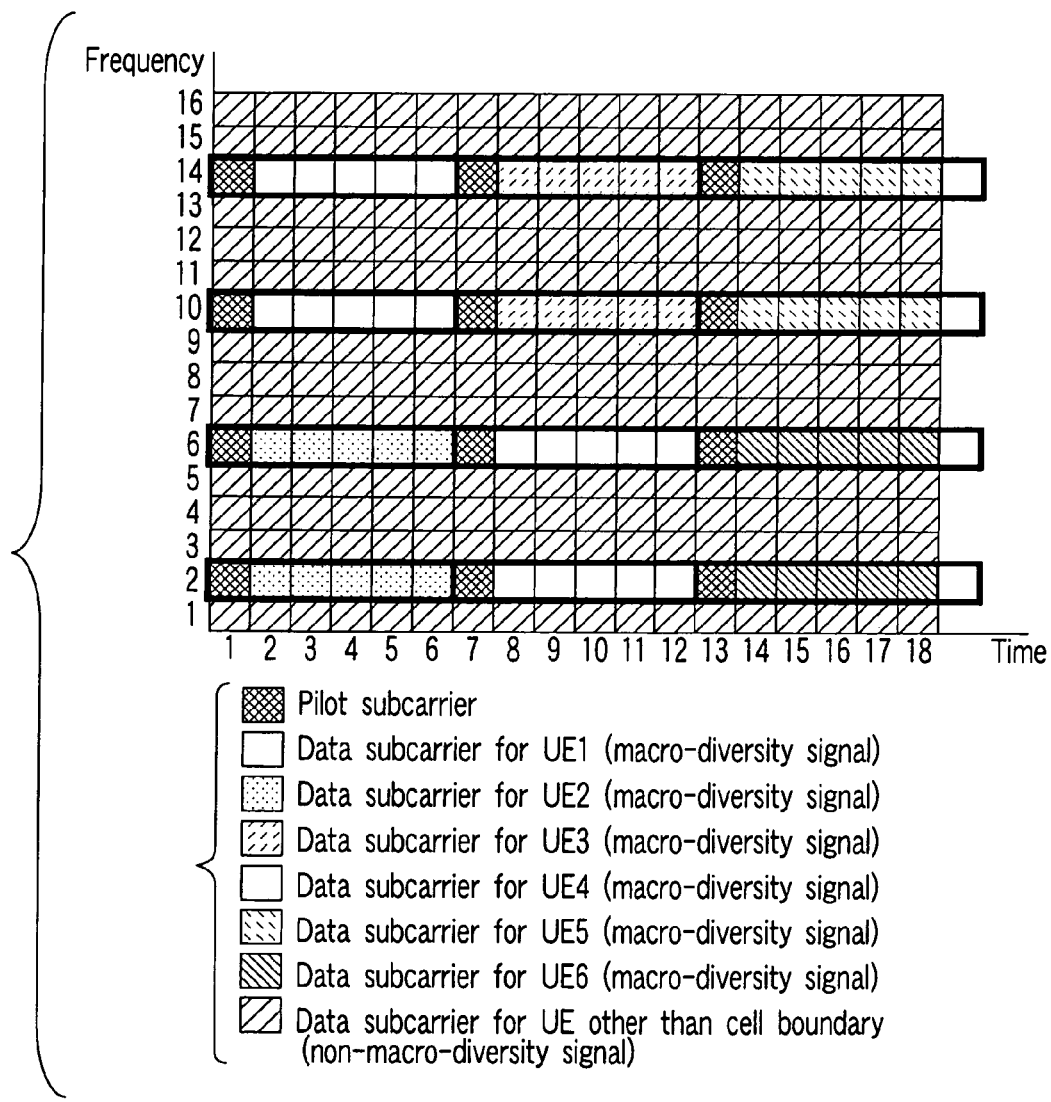
FIG. 29 is an illustration of a modified example of the subcarrier location shown in FIG. 22.
Figure 30:
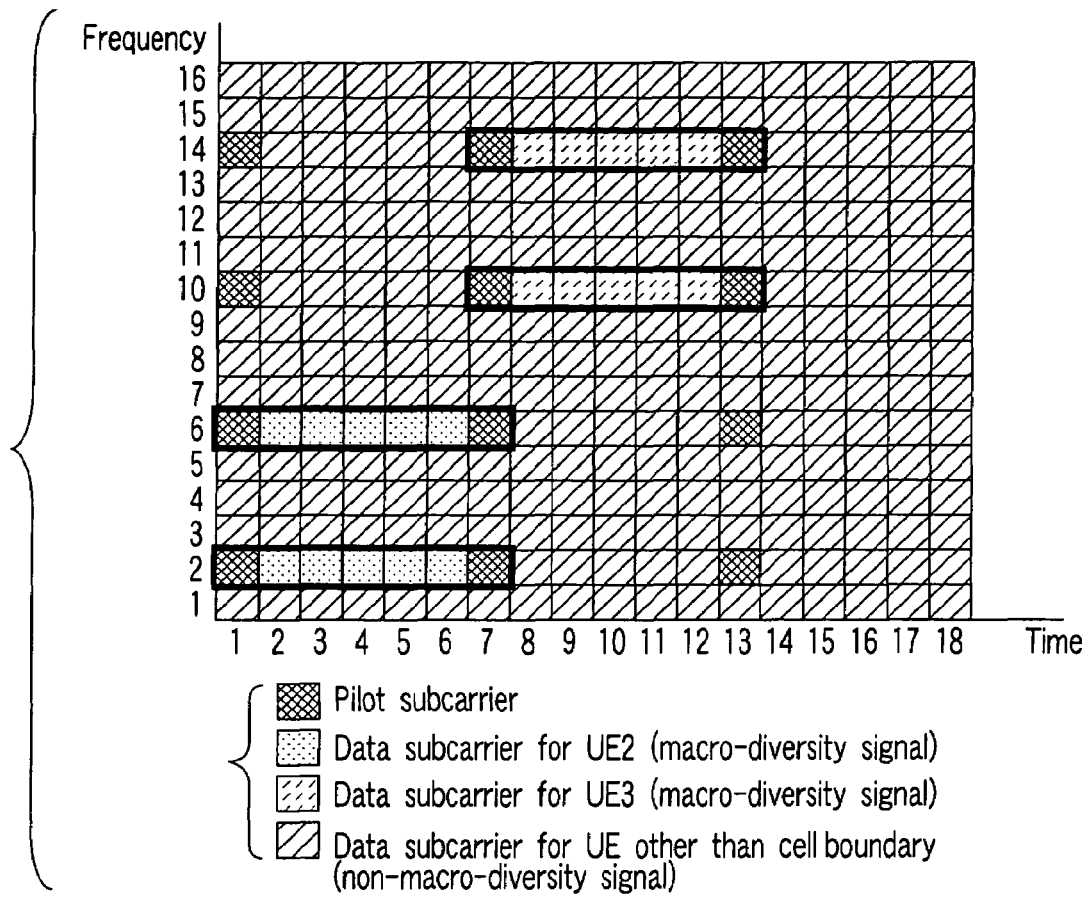
FIG. 30 is an illustration of a modified example of the subcarrier location shown in FIG. 22.

Furthermore, by transmitting the same data signal in the data subcarriers which are present in each of the subcarrier groups from a plurality of base stations to a single user, as shown in FIG. 29, the terminal on the cell boundary can simultaneously receive the signals from a plurality of base stations that are in contact with the boundaries and the cellular system can thereby implement the soft handover. The number of subcarrier groups can be increased or reduced in accordance with the number of users to which the soft handover is applied, as shown in FIG. 30.

In the above-described embodiment, the channel estimation unit 211a conducts the channel estimation of the non-macro-diversity signals outside the subcarrier group, on the basis of the result of the channel estimation of the pilot signals or the other non-macro-diversity signals. However, instead of this or besides this, the channel estimation unit 211a may conduct the channel estimation of the non-macro-diversity signals outside the subcarrier group, by using the result of the channel estimation of the macro-diversity signals as obtained by the channel estimation unit 206a.

In FIG. 22, for example, the channel estimation unit 211a conducts channel estimation of non-macro-diversity signal N1 on the basis of channel estimation value of macro-diversity signal M1 and channel estimation value of macro-diversity signal M6 whose transmission timing is successive with the same frequency as pilot signal P3.

In addition, for example, the channel estimation unit 211a conducts channel estimation of non-macro-diversity signal N0 shown in FIG. 22 on the basis of channel estimations value of the pilot signals P1, P3. However, the channel estimation unit 211a may conduct the channel estimation by using the other pilot signals of the same reception timing as the pilot signals P1, P3 besides the pilot signals P1, P3.

In FIG. 22, for example, when the channel estimation unit 211a conducts channel estimation of non-macro-diversity signal N7, the channel estimation unit 211a obtains a moving average of pilot signals P5, P6, P7, P8 of the same reception timing as non-macro-diversity signal N7 and then conducts the channel estimation in the frequency corresponding to the non-macro-diversity signal N7.

The method of the channel estimation of the data subcarriers is not limited to this. The channel estimation of the data subcarriers which are present in the subcarrier group "may be conducted by using the only pilot subcarriers that are present in the subcarrier group". In addition, the channel estimation of the data subcarrier outside the subcarrier group "can be implemented by using at least one pilot subcarrier that is in a short distance from the data subcarrier on the time-frequency grid, irrespective of the subcarrier group".

Figure 31:
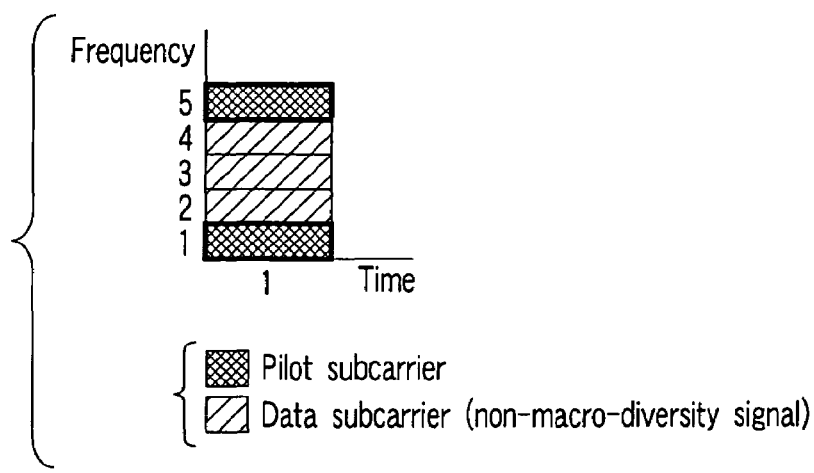
FIG. 31 is an illustration of a modified example of the subcarrier location shown in FIG. 22.

In relation to this, the following method of averaging and interpolation employed for the channel estimation is conceived. For example, a method of conducting linear interpolation corresponding to a distance on the time-frequency grid, for the complex values of two pilot signals, a method of conducting linear interpolation of a phase and an amplitude by processing the channel estimation value of the pilot signal in polar coordinate transformation, and a multi-degree interpolation method using a plurality of pilot signals, are known. An appropriate method is selected in accordance with the calculation amount and performance. An example of linear interpolation is explained here with reference to FIG. 31. In this example, channel estimation values of the data subcarriers are obtained with weights corresponding to distances between the channels of the respective data subcarriers and the pilot signals. With channel estimation values p(0) and p(1), x(0), x(1), x(2) can be obtained as (a*3+b*1)/4, (a*2+b*2)/4, (a*1+b*3)/4, respectively.

Figure 32:
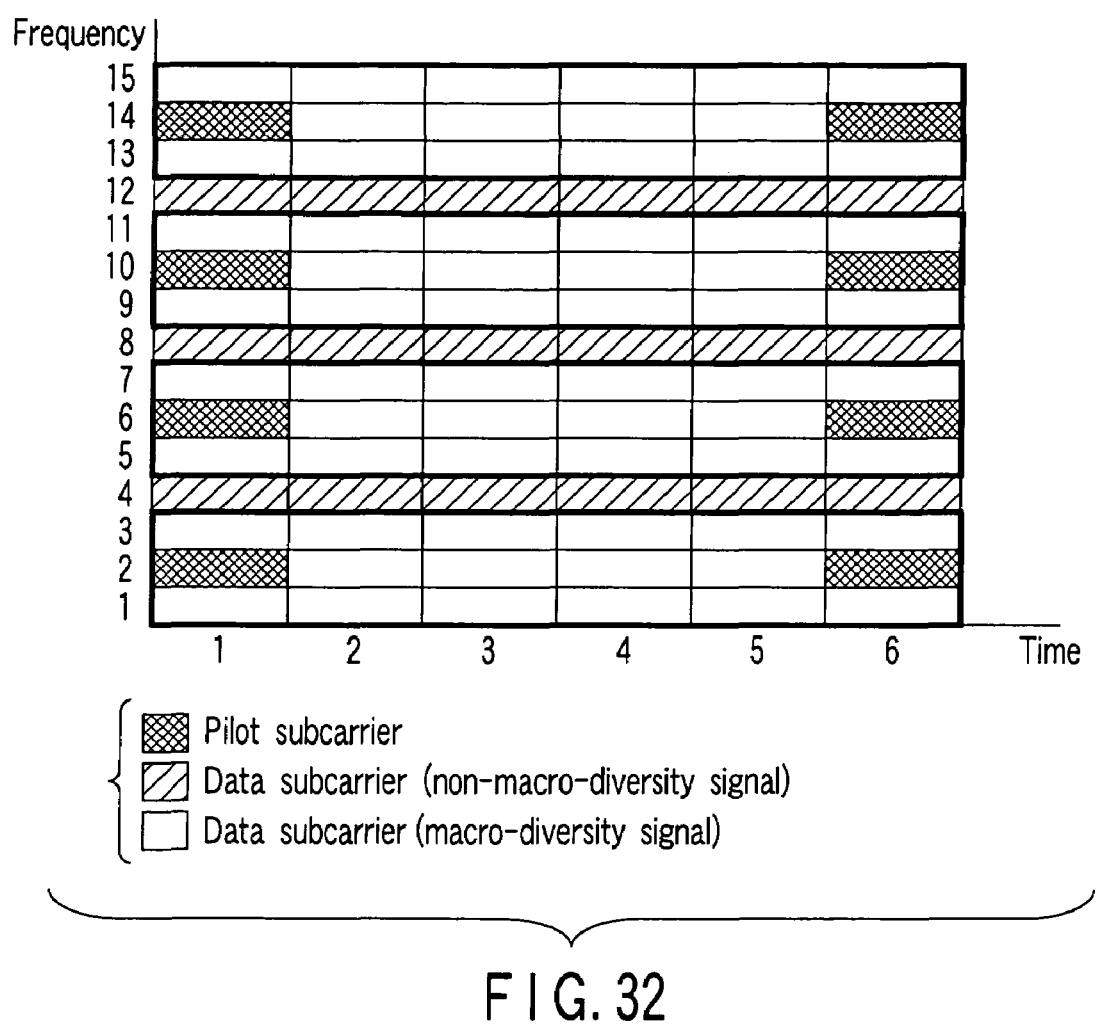
FIG. 32 is an illustration of a modified example of the subcarrier location shown in FIG. 22.

The variations of the pilot subcarrier locations in the subcarrier group are described above with reference to FIG. 22, and FIG. 24 to FIG. 27. However, the pilot subcarrier locations are not limited to these subcarrier locations. The pilot signals in the subcarrier group do not need to be set on the ends of the subcarrier group. In addition, for example, if there is only one pilot signal in the subcarrier group, the channel estimation value obtained from the pilot subcarrier may be copied and used as the channel estimations value of the other subcarriers in the subcarrier group, as shown in FIG. 32.

If there are a plurality of pilot subcarriers in the pilot subcarrier group, the channel estimations value of the other subcarriers may be conducted by the methods such as interpolation, extrapolation, averaging, etc. of the pilot subcarriers. In other words, the pilot signals may be located anywhere in the subcarrier group. If a plurality of pilot signals are present in the frequency direction as shown in FIG. 2, the channel estimation can be conducted by the interpolation in the frequency direction.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An OFDM radio communications system comprising a plurality of transmitters transmitting OFDM signals and a receiver conducting macro-diversity reception based on the OFDM signals, wherein each of the transmitters comprises:
first allocation means for allocating pilot signals to a first pilot subcarrier and a second pilot subcarrier different in frequency, respectively;
second allocation means for allocating macro-diversity signals subjected to macro-diversity to a first data subcarrier, whose frequency is the same as a frequency of the first pilot subcarrier and whose transmission timing is successive to a transmission timing of the first pilot subcarrier, and a second data subcarrier, whose frequency is the same as a frequency of the second pilot subcarrier and whose transmission timing is successive to a transmission timing of the second pilot subcarrier;
third allocation means for allocating a non-macro-diversity signal not subjected to macro-diversity to a third data subcarrier whose frequency is between the frequency of the first pilot subcarrier and the frequency of the second pilot subcarrier and whose transmission timing is between the transmission timing of the first pilot subcarrier and the transmission timing of the second pilot subcarrier; and
transmission means for OFDM-modulating and transmitting the pilot signals, the macro-diversity signals and the non-macro-diversity signal, through the subcarriers to which the signals are allocated by the first allocation means, the second allocation means and the third allocation means; and wherein the receiver comprises:
reception means for receiving the pilot signals, the macro-diversity signals and the non-macro-diversity signal, through the subcarriers transmitted by the transmission means;
first estimation means for conducting channel estimation of the first data subcarrier in accordance with the pilot signal of the first pilot subcarrier received by the reception means, and for conducting channel estimation of the second data subcarrier in accordance with the pilot signal of the second pilot subcarrier received by the reception means; and
second estimation means for conducting channel estimation of the third data subcarrier in accordance with the pilot signal of the first pilot subcarrier received by the reception means and the pilot signal of the second pilot subcarrier received by the reception means.

2. The OFDM radio communications system according to claim 1, wherein the receiver further comprises third estimation means for conducting channel estimation of a non-macro-diversity signal transmitted with a frequency which is the same as the frequency of the third data subcarrier, in accordance with a result of the channel estimation conducted by the second estimation means.

3. The OFDM radio communications system according to claim 1, wherein the receiver further comprises third estimation means for conducting channel estimation of a non-macro-diversity signal transmitted at a timing which is the same as the transmission timing of the first data subcarrier and the second data subcarrier, with a frequency which is the same as the frequency of the third data subcarrier, in accordance with results of the channel estimations of the first data subcarrier and the second data subcarrier conducted by the first estimation means.

4. The OFDM radio communications system according to claim 1, wherein:
the second allocation means allocates macro-diversity signals to a plurality of first data subcarriers whose frequency is the same as the frequency of the first pilot subcarrier and whose transmission timing is successive to the transmission timing of the first pilot subcarrier, respectively;
the second allocation means allocates macro-diversity signals to a plurality of second data subcarriers whose frequency is the same as the frequency of the second pilot subcarrier and whose transmission timing is successive to the transmission timing of the second pilot subcarrier, respectively;
the first allocation means allocates a pilot signal to a third pilot subcarrier that together with the first pilot subcarrier temporally sandwiches the transmission timings of the plurality of first data subcarriers to which the second allocation means allocates the macro-diversity signals;
the first allocation means allocates a pilot signal to a fourth pilot subcarrier that together with second pilot subcarrier temporally sandwiches the transmission timings of the plurality of second data subcarriers to which the second allocation means allocates the macro-diversity signals;
the first estimation means conducts the channel estimation of the plurality of first data subcarriers received by the reception means at reception timings between a reception timing of the pilot signal of the first pilot subcarrier and a reception timing of the pilot signal of the third pilot subcarrier, in accordance with the pilot signal of the first pilot subcarrier and the pilot signal of the third pilot subcarrier, and
the first estimation means conducts the channel estimation of the plurality of second data subcarriers received by the reception means at reception timings between a reception timing of the pilot signal of the second pilot subcarrier and a reception timing of the pilot signal of the fourth pilot subcarrier, in accordance with the pilot signal of the second pilot subcarrier and the pilot signal of the fourth pilot subcarrier.

5. The OFDM radio communications system according to claim 1, wherein:
the first allocation means further allocates pilot signals, respectively, to a plurality of pilot subcarriers whose frequencies are different from one another and whose transmission timings are the same as one another;
the third allocation means allocates a non-macro-diversity signal to a data subcarrier whose frequency is between frequencies of the plurality of pilot subcarriers and whose transmission timing is the same as the transmission timings of the plurality of pilot subcarriers; and the second estimation means conducts channel estimation of the data subcarrier, in accordance with a moving average based on the plurality of pilot subcarriers received by the reception means.

6. An OFDM radio communications system comprising a plurality of transmitters transmitting OFDM signals and a receiver conducting macro-diversity reception based on the OFDM signals,
wherein each of the transmitters comprises:
first allocation means for allocating pilot signals to a first pilot subcarrier and a second pilot subcarrier in different frequencies, at the same transmission timing, respectively;
second allocation means for allocating macro-diversity signals subjected to macro-diversity to a first data subcarrier, whose frequency is the same as a frequency of the first pilot subcarrier and whose transmission timing is successive to a transmission timing of the first pilot subcarrier, and a second data subcarrier, whose frequency is the same as a frequency of the second pilot subcarrier and whose transmission timing is successive to a transmission timing of the second pilot subcarrier;
third allocation means for allocating a non-macro-diversity signal not subjected to macro-diversity to a third data subcarrier whose frequency is between the frequency of the first pilot subcarrier and the frequency of the second pilot subcarrier; and
transmission means for OFDM-modulating and transmitting the pilot signals, the macro-diversity signals and the non-macro-diversity signal, through the subcarriers to which the signals are allocated by the first allocation means, the second allocation means and the third allocation means; and
wherein the receiver comprises:
reception means for receiving the pilot signals, the macro-diversity signals and the non-macro-diversity signal, through the subcarriers transmitted by the transmission means;
first estimation means for conducting channel estimation of the first data subcarrier in accordance with the pilot signal of the first pilot subcarrier received by the reception means, and for conducting channel estimation of the second data subcarrier in accordance with the pilot signal of the second pilot subcarrier received by the reception means; and
second estimation means for conducting channel estimation of the third data subcarrier in accordance with the pilot signal of the first pilot subcarrier received by the reception means and the pilot signal of the second pilot subcarrier received by the reception means.

7. The OFDM radio communications system according to claim 6, wherein the receiver further comprises third estimation means for conducting channel estimation of a non-macro-diversity signal transmitted with a frequency which is the same as the frequency of the third data subcarrier, in accordance with a result of the channel estimation conducted by the second estimation means.

8. The OFDM radio communications system according to claim 6, wherein the receiver further comprises third estimation means for conducting channel estimation of a non-macro-diversity signal transmitted at a timing which is the same as the transmission timing of the first data subcarrier and the second data subcarrier, with a frequency which is the same as the frequency of the third data subcarrier, in accordance with results of the channel estimations of the first data subcarrier and the second data subcarrier conducted by the first estimation means.

9. The OFDM radio communications system according to claim 6, wherein:
- the second allocation means allocates macro-diversity signals to a plurality of first data subcarriers whose frequency is the same as the frequency of the first pilot subcarrier and whose transmission timing is successive to the transmission timing of the first pilot subcarrier, respectively;
- the second allocation means allocates macro-diversity signals to a plurality of second data subcarriers whose frequency is the same as the frequency of the second pilot subcarrier and whose transmission timing is successive to the transmission timing of the second pilot subcarrier, respectively;
- the first allocation means allocates a pilot signal to a third pilot subcarrier that together with the first pilot subcarrier temporally sandwiches the transmission timings of the plurality of first data subcarriers to which the second allocation means allocates the macro-diversity signals;
- the first allocation means allocates a pilot signal to a fourth pilot subcarrier that together with second pilot subcarrier temporally sandwiches the transmission timings of the plurality of second data subcarriers to which the second allocation means allocates the macro-diversity signals;
- the first estimation means conducts the channel estimation of the plurality of first data subcarriers received by the reception means at reception timings between a reception timing of the pilot signal of the first pilot subcarrier and a reception timing of the pilot signal of the third pilot subcarrier, in accordance with the pilot signal of the first pilot subcarrier and the pilot signal of the third pilot subcarrier, and
- the first estimation means conducts the channel estimation of the plurality of second data subcarriers received by the reception means at reception timings between a reception timing of the pilot signal of the second pilot subcarrier and a reception timing of the pilot signal of the fourth pilot subcarrier, in accordance with the pilot signal of the second pilot subcarrier and the pilot signal of the fourth pilot subcarrier.

10. The OFDM radio communications system according to claim 6, wherein:
- the third allocation means allocates the non-macro-diversity signal to a data subcarrier whose frequency is between the frequency of the first pilot subcarrier and the frequency of the second pilot subcarrier and whose transmission timing is the same as the transmission timing of the first pilot subcarrier and the second pilot subcarrier; and
- the second estimation means conducts the channel estimation of the data subcarrier, in accordance with a moving average based on the first pilot subcarrier and the second pilot subcarrier received by the reception means.

* * * * *